US012769325B2

(12) United States Patent
Yoshida et al.

(10) Patent No.: US 12,769,325 B2
(45) Date of Patent: Oct. 20, 2026

(54) CONTROL DEVICE, OPERATION MANAGEMENT SYSTEM, AND NON-TRANSITORY COMPUTER READABLE MEDIUM

(71) Applicant: DENSO CORPORATION, Kariya-city (JP)

(72) Inventors: Shuhei Yoshida, Kariya-city (JP); Masaya Nakamura, Kariya-city (JP)

(73) Assignee: DENSO CORPORATION, Kariya-city (JP)

(*) Notice: Subject to any disclaimer, the term of this patent is extended or adjusted under 35 U.S.C. 154(b) by 0 days.

(21) Appl. No.: 19/173,639

(22) Filed: Apr. 8, 2025

(65) Prior Publication Data

US 2025/0238031 A1 Jul. 24, 2025

Related U.S. Application Data

(63) Continuation of application No. PCT/JP2023/033286, filed on Sep. 13, 2023.

(30) Foreign Application Priority Data

Oct. 13, 2022 (JP) ................................ 2022-164873

(51) Int. Cl.
*G05D 1/485* (2024.01)
*B60L 58/12* (2019.01)
(Continued)

(52) U.S. Cl.
CPC .............. *G05D 1/485* (2024.01); *B60L 58/12* (2019.02); *G05D 1/6546* (2024.01); *G05D 1/80* (2024.01);
(Continued)

(58) Field of Classification Search
CPC ........ G05D 1/485; G05D 1/80; G05D 1/6546; G05D 2109/23; B60L 58/12;
(Continued)

(56) References Cited

U.S. PATENT DOCUMENTS 5,890,441 A * 4/1999 Swinson ................ B64U 10/13 244/12.3
11,377,201 B1 * 7/2022 Auerbach .............. B64D 27/34
(Continued)

FOREIGN PATENT DOCUMENTS

EP 2261116 A2 * 12/2010 ........... G05D 1/0858
EP 3828083 A1 6/2021
(Continued)

OTHER PUBLICATIONS

Vladislav et al., "Concept of Hybrid Reconfiguration of High-speed Rotary-wing Aircraft Flight Control System," 2022, Publisher: IEEE.*
(Continued)

*Primary Examiner* — Tuan C To
(74) *Attorney, Agent, or Firm* — Harness, Dickey & Pierce, P.L.C.

(57) ABSTRACT

A control device controls a flight of an eVTOL including a rotary wing which is driven by a driving device to generate a rotational lift, a fixed wing which generates a gliding lift, and a lift adjustment mechanism which adjusts the gliding lift. The control device includes a rotary wing control unit which adjusts the rotational lift by controlling driving of the rotary wing, and a fixed wing control unit which adjusts the gliding lift by controlling driving of the lift adjustment mechanism. When an abnormality of the driving device is predicted or detected in a flight time of an electric flight vehicle, the rotary wing control unit and the fixed wing control unit perform lift adjustment control such that the
(Continued)

rotary wing control unit reduces the rotational lift and the fixed wing control unit increases the gliding lift.

18 Claims, 15 Drawing Sheets

(51) Int. Cl.
*G05D 1/654* (2024.01)
*G05D 1/80* (2024.01)
*G05D 109/22* (2024.01)

(52) U.S. Cl.
CPC ..... *B60L 2200/10* (2013.01); *B60L 2240/545* (2013.01); *G05D 2109/23* (2024.01)

(58) Field of Classification Search
CPC ........... B60L 2200/10; B60L 2240/545; B64C 27/00; B64C 29/00; B64C 19/00; B64C 3/38; B64C 9/12
USPC ............................................................... 701/3
See application file for complete search history.

(56) References Cited

U.S. PATENT DOCUMENTS

| | | | | |
|---|---|---|---|---|
| 2015/0041583 | A1 | 2/2015 | Kim | |
| 2021/0309122 | A1 | 10/2021 | Wake et al. | |
| 2022/0163978 | A1 | 5/2022 | Moon et al. | |
| 2023/0081498 | A1 * | 3/2023 | Wiegman | B60W 50/14 244/53 R |
| 2024/0199203 | A1 * | 6/2024 | Suzuki | B64U 30/20 |

FOREIGN PATENT DOCUMENTS

| | | | | |
|---|---|---|---|---|
| JP | 2020-196440 A | | 12/2020 | |
| WO | WO-2013074545 A1 | * | 5/2013 | B64U 20/10 |
| WO | WO-2014045276 A1 | * | 3/2014 | B64C 29/0033 |

OTHER PUBLICATIONS

Joonghyun et al., "Experimental Flight Testing of a Fault-Tolerant Adaptive Autopilot for Fixed-Wing Aircraft," 2023, Publisher: IEEE.*

* cited by examiner

CONTROL DEVICE, OPERATION MANAGEMENT SYSTEM, AND NON-TRANSITORY COMPUTER READABLE MEDIUM

CROSS REFERENCE TO RELATED APPLICATION

The present application is a continuation application of International Patent Application No. PCT/JP2023/033286 filed on Sep. 13, 2023, which designated the U.S. and claims the benefit of priority from Japanese Patent Application No. 2022-164873 filed on Oct. 13, 2022. The entire disclosures of all of the above applications are incorporated herein by reference.

TECHNICAL FIELD

The present disclosure relates to a control device, an operation management system, and a non-transitory computer readable medium.

BACKGROUND

Conventionally, a flight vehicle including a propeller and an electric rotary machine for driving the propeller has been known.

SUMMARY

According to one aspect of the disclosure, a control device is for an electric flight vehicle. The electric flight vehicle includes a rotary wing configured to be driven by a driving device to generate rotational lift, a fixed wing configured to generate gliding lift, and a lift adjustment mechanism configured to adjust the gliding lift.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
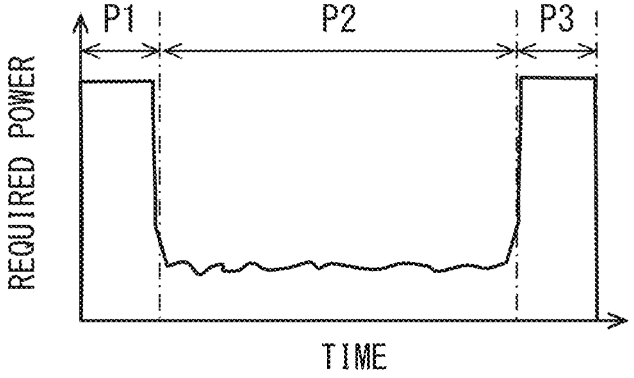
FIG. 1 is a diagram showing a power profile of an eVTOL.

Hereinafter, examples of the present disclosure will be described.

According to an example of the present disclosure, a drone includes rotary wings driven using electric power of a battery as disclosed in, for example, US2021/0309122 corresponding to JP2020-196440A. Contents of the description of US2021/0309122 are incorporated by reference as a description of technical elements in this description.

In a rotary-wing driving device including a battery, a temporary abnormality in a temperature or an SOC may occur due to variations in a high output load or a flight environment. For example, even if multiple driving devices are provided for redundancy as discussed in the above example, the above-described abnormality may occur simultaneously in the multiple driving devices. That is, there is a concern that the redundancy of the driving device cannot be secured. In the above viewpoint and other viewpoints that are not mentioned, further improvements are required for a control device, an operation management system, and a non transitory computer readable medium storing a control program.

According to an example of the disclosure, a control device is for an electric flight vehicle. The electric flight vehicle includes a rotary wing configured to be driven by a driving device to generate rotational lift, a fixed wing configured to generate gliding lift, and a lift adjustment mechanism configured to adjust the gliding lift. The control device comprises: a rotary wing control unit configured to adjust the rotational lift by controlling driving of the rotary wing; and a fixed wing control unit configured to adjust the gliding lift by controlling driving of the lift adjustment mechanism. When an abnormality of the driving device is predicted or detected in a flight time of the electric flight vehicle, the rotary wing control unit and the fixed wing control unit are configured to perform lift adjustment control such that the rotary wing control unit reduces the rotational lift and the fixed wing control unit increases the gliding lift.

According to the control device of the disclosure, the rotational lift is reduced when the abnormality of the driving device is predicted or detected. Accordingly, a load on the driving device can be reduced, and a possibility of preventing or eliminating the abnormality can be increased. Since the gliding lift is increased as the rotational lift is reduced, a decrease in the lift can be limited. Thus, safety of the flight can be enhanced.

According to an example of the disclosure, an operation management system is for an electric flight vehicle. The electric flight vehicle includes a rotary wing configured to be driven by a driving device to generate rotational lift, a fixed wing configured to generate gliding lift, and a lift adjustment mechanism configured to adjust the gliding lift. The operation management system comprises: an information acquisition device configured to acquire information related to flight of the electric flight vehicle; and a control device configured to perform flight control based on the information. The control device includes a rotary wing control unit configured to adjust the rotational lift by controlling driving of the rotary wing, and a fixed wing control unit configured to adjust the gliding lift by controlling driving of the lift adjustment mechanism. When information indicating that an abnormality of the driving device is predicted or detected is acquired as the information in a flight time of the electric flight vehicle, the rotary wing control unit and the fixed wing control unit are configured to perform lift adjustment control such that the rotary wing control unit reduces the rotational lift and the fixed wing control unit increase the gliding lift.

According to the operation management system of the disclosure, the rotational lift is reduced when the abnormality of the driving device is predicted or detected. Accordingly, the load on the driving device can be reduced, and the possibility of preventing or eliminating the abnormality can be increased. Since the gliding lift is increased as the rotational lift is reduced, the decrease in the lift can be limited. Thus, the safety of the flight can be enhanced.

According to an example of the disclosure, a control program is for controlling an electric flight vehicle. The electric flight vehicle includes a rotary wing configured to be driven by a driving device to generate rotational lift, a fixed wing configured to generate gliding lift, and a lift adjustment mechanism configured to adjust the gliding lift. The control program is configured to cause at least one processing unit to: adjust the rotational lift by controlling driving of the rotary wing; adjust the gliding lift by controlling driving of the lift adjustment mechanism; and when an abnormality of the driving device is predicted or detected in a flight time of the electric flight vehicle, perform control for reducing the rotational lift and increasing the gliding lift.

According to the control program of the disclosure, the rotational lift can be reduced when the abnormality of the driving device is predicted or detected. Accordingly, the load on the driving device can be reduced, and the possibility of preventing or eliminating the abnormality can be increased. Since the gliding lift is increased as the rotational lift is reduced, the decrease in the lift can be limited. Thus, the safety of the flight can be enhanced.

Hereinafter, multiple embodiments will be described with reference to the drawings. Duplicate descriptions may be omitted by designating corresponding components by the same reference numerals in each embodiment. When only a part of a configuration is described in each embodiment, a configuration of another embodiment described earlier can be applied to the other part of the configuration. Further, in addition to combinations of configurations explicitly shown in the description of the embodiments, the configurations of multiple embodiments can be partially combined even when the combinations are not explicitly shown as long as there is no problem in the combinations in particular.

First Embodiment

A control device, an operation management system, and a control program to be described below are applied to an electric flight vehicle. The electric flight vehicle includes a motor (rotary electric machine) as a driving source for movement. The electric flight vehicle may be referred to as an electric flight vehicle, an electric aircraft, or the like. The electric flight vehicle is movable in a vertical direction and a horizontal direction. The electric flight vehicle can move in a direction having a vertical direction component and a horizontal direction component, that is, in an oblique direction. Examples of the electric flight vehicle include an electronic vertical take-off and landing aircraft (eVTOL), an electronic short distance take-off and landing aircraft (eSTOL), and a drone. The eVTOL is an abbreviation of an electronic vertical take-off and landing aircraft. The eSTOL is an abbreviation of an electronic short distance take-off and landing aircraft.

The electric flight vehicle may be any of a manned aircraft and an unmanned aircraft. In a case of the manned aircraft, the electric flight vehicle is operated by a pilot as an operator. In a case of the unmanned aircraft, the electric flight vehicle may be remotely operated by an operator or may be automatically and remotely operated by a control system. As an example, the electric flight vehicle of the present embodiment is the eVTOL.

<Power Profile>

FIG. 1 shows a power profile from take-off to landing of the eVTOL. Power profiles of electric flight vehicles other than eVTOL are similar to that of the eVTOL. A period P1 is referred to as a take-off period, a take-off time, a departure period, a departure time, or the like. A period P2 is referred to as a cruising period, a cruising time, or the like. A period P3 is referred to as a landing period, a landing time, an arrival period, an arrival time, or the like. For convenience, in FIG. 1, required power, that is, an output is constant in substantially an entire region of each of the periods P1 and P3.

The eVTOL ascends from a take-off point to a cruising start point in the period P1. The eVTOL cruises at a predetermined altitude in the period P2. The eVTOL descends from an end point of the period P2 to a landing point in the period P3. A movement of the eVTOL mainly includes a horizontal direction component in the period P2 and mainly includes a vertical direction component in each of the periods P1 and P3. In the periods P1 and P3 in which the eVTOL moves in the vertical direction, a high output continuous for a predetermined time is required by driving a rotary wing of the eVTOL.

Due to the high output, a large load is applied to a battery or an EPU which is a driving device for driving the rotary wing. Thus, the battery or the EPU generates heat, and increases in temperature. The high output continuous for a predetermined time significantly decreases a remaining capacity (SOC) of the battery. The EPU is an abbreviation of an electric propulsion unit. The SOC is an abbreviation of a state of charge. Necessary output characteristics tend to vary due to an influence of environment such as a wind direction, a wind speed, and an atmospheric pressure at the take-off and landing points, and an influence of operation characteristics such as a skill of the pilot and an individual difference of the airframe.

Therefore, for example, when high output characteristics exceeding assumption are required during the take-off time, there is a concern that a high temperature abnormality or a low SOC abnormality occurs in the middle of cruising, the required high output characteristics cannot be secured and vertical landing is difficult. During the cruising time, an environmental temperature (outside air temperature) decreases due to an influence of an altitude. In particular, in a cold zone, a low temperature environment is severe. Accordingly, as the battery temperature decreases, there is a concern that a low temperature abnormality occurs in a worst case, and vertical landing is difficult due to a decrease in output characteristics caused by an increase in resistance of the battery.

It is very important to improve safety by providing redundancy on an assumption that an abnormality occurs in the driving device. However, the above-described temperature abnormality and SOC abnormality may occur simultaneously in the multiple driving devices. Thus, there is a concern that the redundancy of the driving device cannot be secured.

The above-described temperature abnormality and SOC abnormality are temporary abnormalities. The temporary abnormality is not a permanent abnormality that cannot be recovered, such as a disconnection abnormality or battery capacity deterioration. The temporary abnormality is an abnormality in which an abnormal state can be solved, for example, self-heat-generation which is eliminated by natural cooling when the operation is stopped.

<Lift>

A lift L acting on the eVTOL is expressed by Equation 1. Drag D is expressed by Equation 2. In Equations 1 and 2, p is an air density, V is a wing speed, and S is a surface area of a fixed wing. The wing speed V may be referred to as an airspeed, a flight speed, or the like. CL is a lift coefficient, and CD is a drag coefficient.

$$L=(CL\cdot\rho\cdot V^2\cdot S)/2 \quad \text{(Equation 1)}$$

$$D=(CD\cdot\rho\cdot V^2\cdot S)/2 \quad \text{(Equation 2)}$$

The lift L and the drag D increase as the wing speed V (flight speed) increases, and decrease as the wing speed V decreases. The lift L and the drag D decrease because the air density p decreases as a flight altitude increases, and increase because the air density p increases as the flight altitude decreases. The lift L and the drag D can be varied respectively according to the lift coefficient CL and the drag coefficient CD determined by the surface area and a wing type of the fixed wing.

Accordingly, it is preferable to adjust, for stable and safe flight, the lift, specifically, a rotational lift and a gliding lift so as to fall within a range of the flight speed and the flight altitude allowed based on rules, regulations, and the like in a flight region.

<eVTOL>

Figure 2:
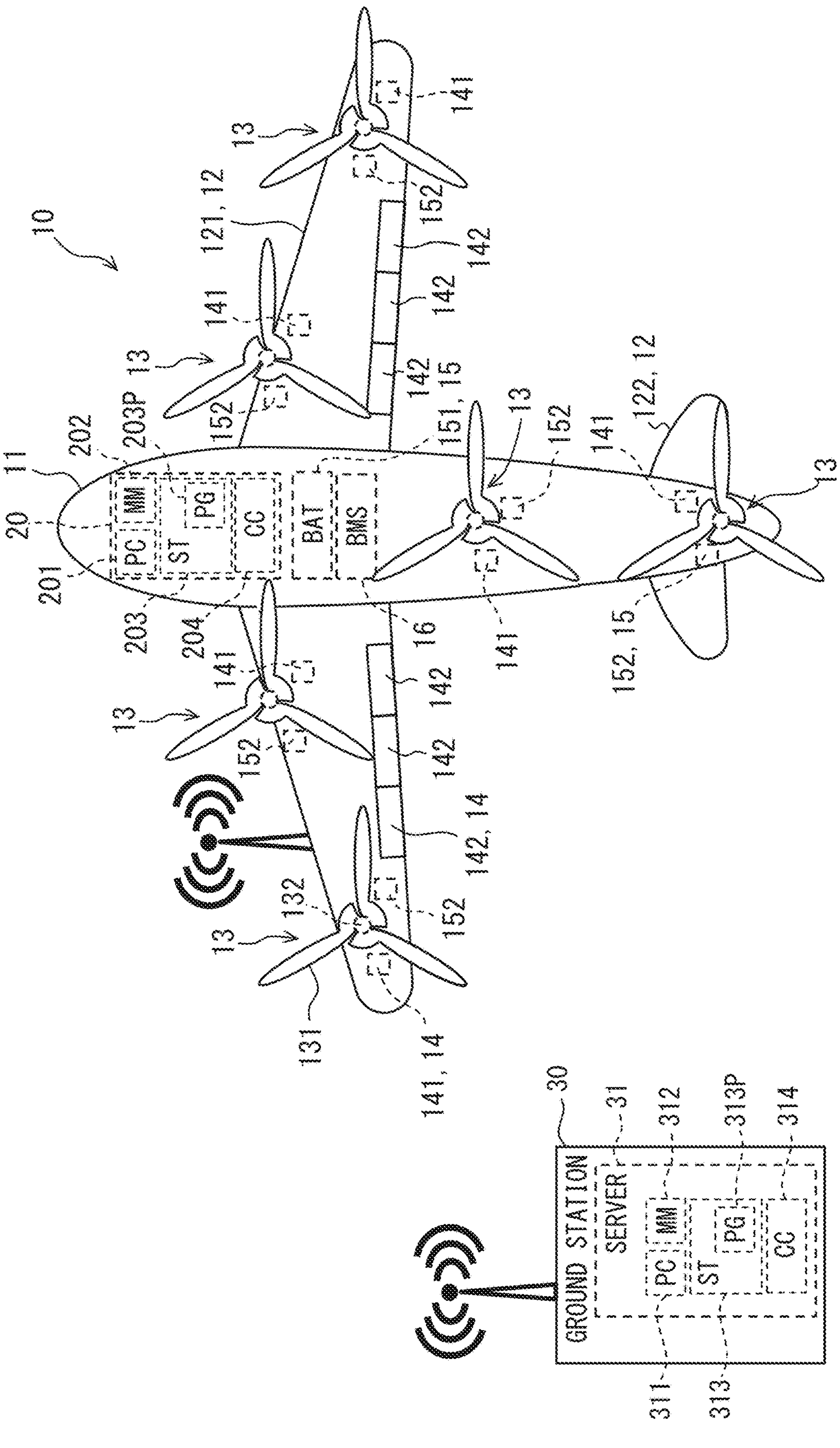
FIG. 2 is a diagram showing a configuration of the eVTOL and a ground station in a first embodiment.

FIG. 2 shows the eVTOL and a ground station. As shown in FIG. 2, an eVTOL 10 includes an airframe main body 11, fixed wings 12, rotary wings 13, and a lift adjustment mechanism 14. The eVTOL 10 further includes a driving device 15 and a BMS 16.

The airframe main body 11 is a body portion of an airframe. The airframe main body 11 extends in a front-rear direction. The airframe main body 11 includes an occupant compartment for carrying occupants and/or a luggage compartment in which luggage is loaded.

Each of the fixed wings 12 is a wing portion of the airframe and is continuous to the airframe main body 11. The fixed wings 12 provide the gliding lift. The gliding lift is a lift generated by the fixed wings 12. As an example, the fixed wings 12 include a main wing 121 and a tail wing 122. The main wing 121 extends in a left-right direction from a vicinity of a center of the airframe main body 11 in the front-rear direction. The tail wing 122 extends in the left-right direction from a rear portion of the airframe main body 11. A shape of the fixed wing 12 is not particularly limited. For example, a swept-back wing, a delta wing, or a straight wing may be adopted.

Multiple rotary wings 13 are provided in the airframe. At least a part of the multiple rotary wings 13 may be provided on the fixed wing 12. At least a part of the multiple rotary wings 13 may be provided on the airframe main body 11. The number of the rotary wings 13 provided in the eVTOL 10 is not particularly limited. As an example, the multiple rotary wings 13 are provided in each of the airframe main body 11 and the main wing 121. The eVTOL 10 includes six rotary wings 13.

Each of the rotary wings 13 may be referred to as a rotor, a propeller, a fan, or the like. The rotary wing 13 includes blades 131 and a shaft 132. The blades 131 are attached to the shaft 132. The blades 131 are vanes that rotate together with the shaft 132. The blades 131 extend radially around an axis of the shaft 132. The shaft 132 is a rotary shaft of the rotary wings 13 and is rotationally driven by a motor of an EPU 152.

The rotary wings 13 generate a propulsive force by rotation. The propulsive force acts on the eVTOL 10 mainly as the rotational lift during the take-off time and the landing time of the eVTOL 10. The rotary wing 13 mainly provides the rotational lift during the take-off time and the landing time. The rotational lift is a lift generated due to the rotation of the rotary wing 13. During the take-off time and the landing time, the rotary wing 13 may provide only the rotational lift, or may provide a forward thrust as well as the rotational lift. The rotary wing 13 provides the rotational lift when the eVTOL 10 hovers.

The propulsive force acts on the eVTOL 10 mainly as a thrust during the cruising time of the eVTOL 10. The rotary wings 13 mainly provide the thrust during the cruising time. During the cruising time, the rotary wing 13 may provide only the thrust, or may provide the lift as well as the thrust.

The lift adjustment mechanism 14 adjusts the gliding lift of the fixed wings 12. The lift adjustment mechanism 14 increases or decreases the gliding lift generated by the fixed wings 12. The lift adjustment mechanism 14 adjusts the gliding lift by adjusting at least one of the surface area, an angle of attack (AOA), a camber (curvature of the wing), a stall AOA, and a wing speed of each of the fixed wings 12, for example. The AOA is an abbreviation of an angle of attack. As an example, the lift adjustment mechanism 14 includes tilt mechanisms 141 and flaps 142.

Each of the tilt mechanisms 141 is driven to adjust a tilt angle of the rotary wing 13. The tilt mechanism 141 constitutes a tilt adjustment device together with a motor which drives the tilt mechanism 141, an inverter, and the like. The tilt adjustment device including the tilt mechanism 141 is individually provided for, for example, each of the rotary wings 13. The tilt mechanism 141 adjusts the tilt angle of the rotary wing 13 by adjusting a relative inclination of the rotary wing 13 with respect to the airframe.

During the take-off time and the landing time, the tilt mechanism 141 controls the tilt angle such that an axis of each rotary wing 13 approaches a position parallel to the vertical direction. Accordingly, the propulsive force generated by the rotation of each rotary wing 13 mainly acts on the eVTOL 10 as the rotational lift. Thus, the eVTOL 10 can take off and land at a short distance and take off and land in the vertical direction.

During the cruising time, the tilt mechanism 141 controls the tilt angle such that the axis of each rotary wing 13 approaches a position parallel to the horizontal direction. Accordingly, the propulsive force generated by the rotation of each rotary wing 13 mainly acts on the eVTOL 10 as the thrust. Thus, the eVTOL 10 can advance forward by the forward thrust generated by the rotation of each rotary wing 13 while obtaining the gliding lift by the fixed wings 12. The gliding lift can be adjusted by changing the wing speed V using the thrust.

An example in which the tilt mechanism 141 is individually provided for the rotary wing 13 is described, but the disclosure is not limited thereto. For example, the tilt angles of multiple rotary wings 13 arranged side by side may be controlled by a common tilt mechanism. The rotary wing 13 may be integrated with a part of the wing portion, and a part of the wing portion and the rotary wing 13 may be displaced integrally by the tilt mechanism.

Each of the flaps 142 is a movable wing piece and is provided on the fixed wing 12. The flap 142 constitutes a flap adjustment device together with a motor which drives the flap 142, an inverter, and the like. The flap 142 may be referred to as a high-lift device. As an example, multiple flaps 142 are provided at a rear edge of the main wing 121. A motor and an inverter are provided in each of the multiple flaps 142. The flap 142 may be provided on the tail wing 122 in addition to the main wing 121. The flap 142 may be provided at a front edge of the fixed wing 12.

The flap 142 adjusts the surface area and the camber of the fixed wing 12. For example, by controlling the flaps 142 provided on the main wing 121 to a lower position, the gliding lift acting on the main wing 121 increases. By moving the flaps 142 in a direction protruding from the main wing 121, the gliding lift can also be further increased.

The lift adjustment mechanism 14 is not limited to the tilt mechanism 141 and the flap 142. As the lift adjustment mechanism 14, a tilt mechanism which adjusts relative inclination of the fixed wing 12 with respect to the airframe main body 11 may be adopted. In this case, the angle of attack of the fixed wing 12 can be adjusted. As the lift adjustment mechanism 14, a thrust rotary wing provided separately from the rotary wing 13 may be adopted. In this case, the wing speed can be adjusted. Further, by providing the thrust rotary wing, the rotary wing 13 can be used exclusively for the lift (rotational lift).

A variable wing may be adopted as the lift adjustment mechanism 14. The lift can be adjusted by changing the surface area, the camber, an attachment angle, and the like of the fixed wing 12. As the lift adjustment mechanism 14, a high-lift device other than the flap 142, for example, a slat may be adopted. The slat is provided at the front edge of the main wing 121. By moving the slat forward with respect to the main wing 121, a gap can be formed between the slat and the main wing 121, to delay separation. Thus, the lift can be increased up to a higher angle of attack without stalling. That is, the stall AOA can be delayed.

The driving device 15 is at least one of devices for rotationally driving the rotary wing 13. The driving device 15 includes a battery (BAT) 151 and/or the EPU 152. The battery 151 is a rechargeable secondary battery capable of storing DC power. The secondary battery is, for example, a lithium-ion battery and a nickel-hydrogen battery. As the battery 151, a fuel cell, a generator, or the like may be used in addition to the secondary battery. The battery 151 supplies electric power to the EPU 152, the tilt adjustment device, the flap adjustment device, and the like. The battery 151 supplies electric power to an auxiliary machine (not shown) such as an air conditioner, an ECU 20 to be described later, and the like.

Figure 4:
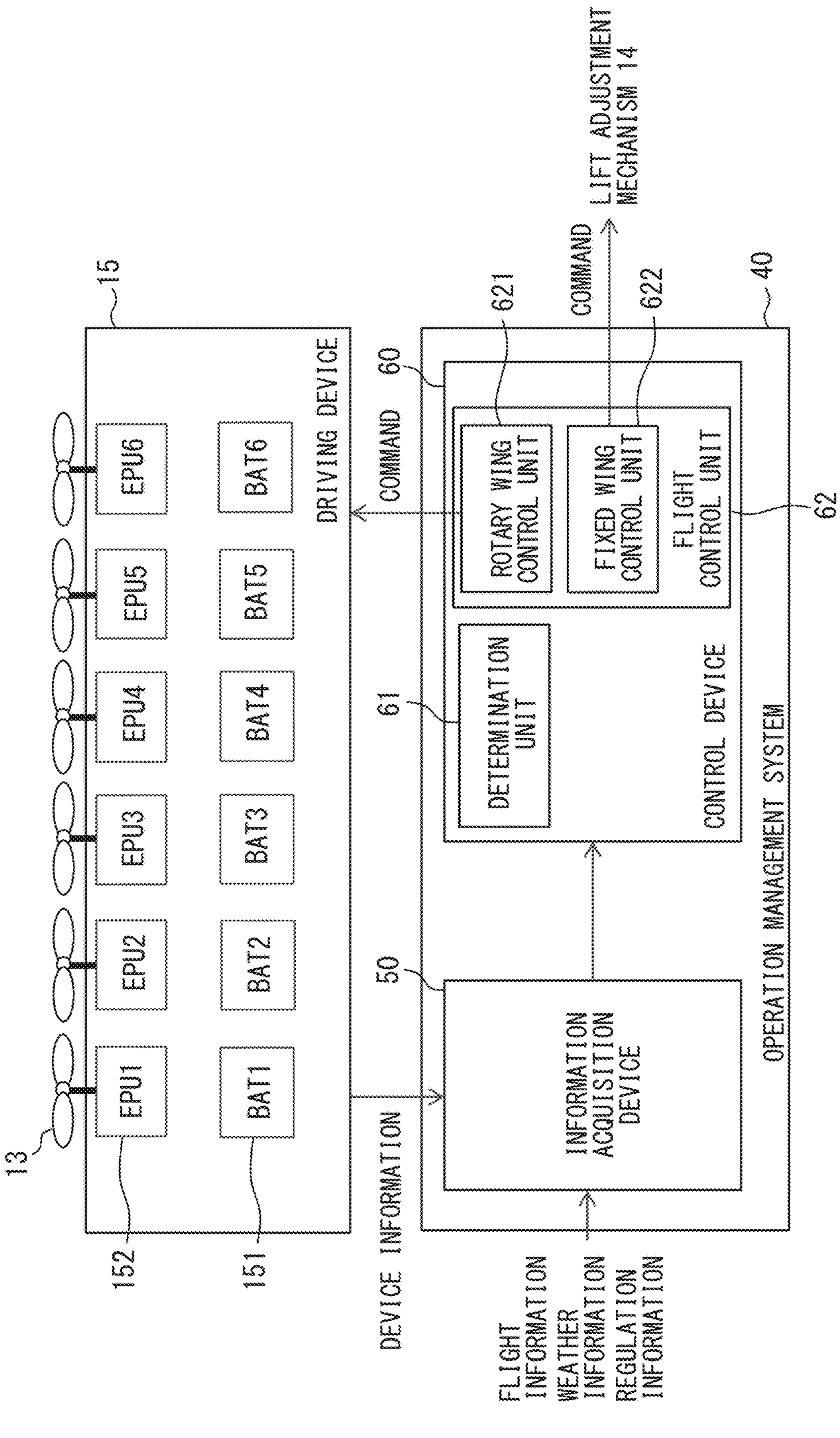
FIG. 4 is a diagram showing a schematic configuration of the operation management system.

As an example, the eVTOL 10 of the present embodiment includes multiple batteries 151 (see FIG. 4). The multiple batteries 151 may be connected in series and/or in parallel, or may be independent of each other without being connected to each other. Each of the batteries 151 includes multiple battery cells connected in series or includes multiple battery cells connected in parallel and in series. The number and arrangement of the batteries 151 are not particularly limited. As an example, the batteries 151 of the present embodiment are redundantly provided for the EPU 152. That is, the electric power can be supplied from the multiple batteries 151 to one EPU 152.

For a reason to be described later, the battery cell is preferably a battery cell that has a low resistance in a low SOC region and can obtain a high output. As a positive electrode material, for example, LCO, NMC, NCA, LFP, and LMFP can be adopted. The LCO is lithium cobalt oxide ($LiCoO_2$). The NMC is a lithium nickel cobalt manganese oxide ($Li(NiMnCo)O_2$). The NCA is lithium nickel cobalt aluminate ($Li(NiCoAl)O_2$). The LFP is lithium iron phosphate ($LiFePO_4$). The LMFP is lithium manganese iron phosphate ($LiFe_xMn_yPO_4$). In particular, a positive electrode of LMFP or a cathode obtained by blending LMFP and NMC, which have low resistance in the low SOC region is preferable.

As a negative electrode material, for example, carbon materials such as hard carbon and soft carbon; silicon; lithium materials; and titanium materials such as LTO and NTO can be adopted. The LTO is lithium titanate ($Li_4Ti_5O_{12}$). The NTO is niobium titanium oxide ($TiNb_2O_7$). In particular, a negative electrode of a carbon material or a negative electrode of a titanium material, which has low resistance in the low SOC region is preferable.

The EPUs 152 each include a motor and an inverter, and rotationally drive the rotary wings 13 which apply the propulsive force to the eVTOL 10. As an example, the same number of EPUs 152 as the rotary wings 13 are provided. That is, the eVTOL 10 includes six EPUs 152. The EPU 152 and the rotary wing 13 are connected in a one-to-one relationship. Instead, two or more rotary wings 13 may be connected to one EPU 152 via a gear box.

The BMS 16 monitors states of the batteries 151. The BMS is an abbreviation of a battery management system. For example, one BMS 16 is provided for one battery 151. For example, by monitoring the state of each of the multiple batteries 151, the BMS 16 may predict an abnormality of each battery 151 or may detect an abnormality of each battery 151. The eVTOL 10 further includes the ECU 20 and the auxiliary machine (not shown). The ECU is an abbreviation of an electronic control unit.

<Operation Management System>

The operation management system is a system for creating an operation plan, monitoring an operation status, collecting and managing information related to an operation, supporting the operation, and the like. At least a part of functions of the operation management system may be arranged in an internal computer of the eVTOL 10. At least a part of the functions of the operation management system may be arranged in an external computer that can wirelessly communicate with the eVTOL 10. An example of the external computer is a server 31 of a ground station 30 shown in FIG. 2. The ground station 30 can wirelessly communicate with the eVTOL 10. The ground station 30 can wirelessly communicate with other ground stations.

As an example, in the present embodiment, a part of the functions of the operation management system is arranged in the ECU 20 of the eVTOL 10, and a part of the functions of the operation management system is provided in the server 31 of the ground station 30. The functions of the operation management system are shared between the ECU 20 and the server 31.

As shown in FIG. 2, the ECU 20 includes a processor (PC) 201, a memory (MM) 202, a storage (ST) 203, a communication circuit (CC) 204 for wireless communication, and the like. The processor 201 executes various processes by accessing the memory 202. The memory 202 is a rewritable volatile storage medium. The memory 202 is, for example, a RAM. The RAM is an abbreviation of a random access memory. The storage 203 is a rewritable nonvolatile storage medium. The storage 203 stores a program (PG) 203P to be executed by the processor 201. The program 203P constructs multiple functional units by causing the processor 201 to execute multiple instructions. The ECU 20 may include multiple processors 201.

Similar to the ECU 20, the server 31 includes a processor (PC) 311, a memory (MM) 312, a storage (ST) 313, a communication circuit (CC) 314, and the like. The processor 311 executes various processes by accessing the memory 312. The memory 312 is a rewritable volatile storage medium, for example, a RAM. The storage 313 is a rewritable nonvolatile storage medium. The storage 313 stores a program (PG) 313P to be executed by the processor 311. The program 313P constructs multiple functional units by causing the processor 311 to execute multiple instructions. The server 31 may include multiple processors 311.

Figure 3:
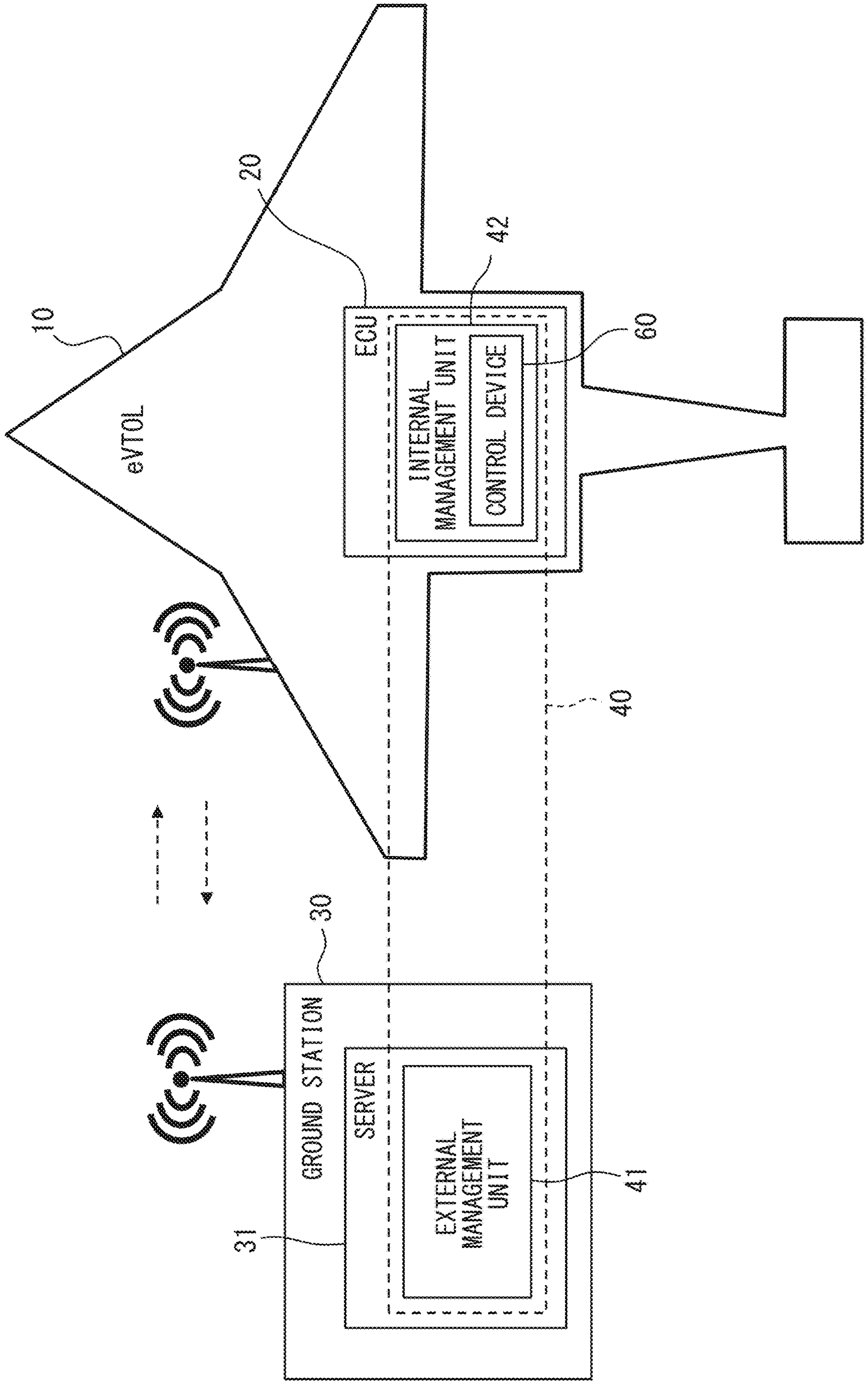
FIG. 3 is a diagram showing a functional arrangement of an operation management system in the first embodiment.

FIG. 3 shows a functional arrangement of the operation management system. As shown in FIG. 3, as an example, an operation management system 40 of the present embodiment includes an external management unit 41 and an internal management unit 42. The external management unit 41 is functionally disposed in the server 31 of the ground station 30. The internal management unit 42 is functionally disposed in the ECU 20 of the eVTOL 10. In this way, a part of the functions of the operation management system 40 is provided in the server 31, and the other part of the functions are arranged in the ECU 20. The external management unit 41 and the internal management unit 42 can wirelessly communicate with each other. The internal management unit 42 can communicate with various devices arranged in the eVTOL 10 in a wired or wireless manner.

FIG. 4 shows a schematic configuration of the operation management system. As described above, the operation management system 40 creates an operation plan, monitors an operation status, collects and manages information related to the operation, supports the operation, and the like. The operation management system 40 includes an information acquisition device 50 and a control device 60 as functional units.

The information acquisition device 50 may be functionally disposed in the ECU 20 of the eVTOL 10 or may be functionally disposed in the server 31 of the ground station 30. The information acquisition device 50 may be disposed as a part of the external management unit 41 or as a part of the internal management unit 42. The information acquisition device 50 acquires information (related information) related to a flight of the eVTOL 10.

The information acquisition device 50 acquires information (device information) related to the driving device 15 as the related information. The information acquisition device 50 may acquire information (necessary information) necessary for the flight in addition to the device information. The necessary information includes at least one of flight information, weather information, and information such as regulations and rules. The flight information may include, for example, a flight altitude, a flight speed, a posture (angle), and a flight position in a current flight. As the flight information, information such as a flight altitude and a flight speed in the operation plan may be acquired in addition to the information in the current flight. The weather information may include, for example, a wind direction, a wind speed, and an atmospheric pressure. The information such as regulations and rules may include, for example, the presence or absence of noise regulations and rules regarding the flight altitude.

As an example, the information acquisition device 50 of the present embodiment acquires information related to the batteries 151 from the BMS 16. The information acquisition device 50 acquires information of each of the multiple batteries 151. The information acquisition device 50 may include abnormality prediction information of the battery 151 predicted by the BMS 16 or abnormality detection information of the battery 151 detected by the BMS 16, as the battery information to be acquired. That is, information related to the abnormality of the battery 151 is acquired. The information acquisition device 50 acquires the flight information, the weather information, and the information such as regulations and rules. As to be described later, in the present embodiment, information related to the low SOC abnormality and/or information related to the high temperature abnormality is acquired as the information related to the abnormality of the battery 151.

The information acquisition device 50 may collect the device information at predetermined cycle, for example, while the eVTOL 10 is in flight (flying). The information acquisition device 50 may acquire the device information at a predetermined timing during the flight. As described above, since a high output continuous for a predetermined time is required during the take-off time, a temporary abnormality is likely to occur in the battery 151 and the EPU 152 which are the driving device 15. The information acquisition device 50 may acquire the device information immediately after an end of the take-off period P1, for example. The information acquisition device 50 may acquire the device information after a predetermined period from the end of the take-off period P1 in consideration of a time delay from application of a load to occurrence of an abnormality.

As described above, a high output continuous for a predetermined time is also required during the landing time. Therefore, in order to eliminate a temporary abnormality before a start of the landing even if the abnormality occurs, it is preferable to secure a predetermined period for performing lift adjustment control to be described later. That is, it is preferable to collect the device information at least a predetermined period before a start of the landing period P3. By performing the lift adjustment control, a possibility of eliminating the temporary abnormality before the start of landing can be increased.

The predetermined period may be set based on history information. Since the operation plan of the eVTOL 10 is finite and a repetition frequency is high, the history information can be utilized. As the history information, it is preferable to use past data in which operation conditions substantially match or are similar to those of the current flight, for example. For example, past data of the same model (type) with the same travel route in similar time period and/or weather conditions is preferable. The past data of the same model may include not only past data of the own aircraft but also past data of other aircrafts, and more preferably, the past data of the own aircraft may be used.

The information acquisition device 50 acquires at least a part of the necessary information at a predetermined cycle. The information acquisition device 50 may initially acquire a part of the necessary information. The information acquisition device 50 may acquire the weather information initially or periodically at a predetermined cycle. When the weather information is acquired at a predetermined cycle, more detailed weather information related to an airzone in flight can be acquired. The information acquisition device 50 may acquire the information such as regulations and rules initially or periodically at a predetermined cycle. The information acquisition device 50 acquires the flight information related to the current flight at a predetermined cycle. Accordingly, the control device 60 can perform feedback control of the flight.

The control device 60 controls the flight of the eVTOL 10. The control device 60 performs various processes related to flight control of the eVTOL 10 based on the information acquired by the information acquisition device 50. As an example, the control device 60 of the present embodiment is functionally disposed in the ECU 20 of the eVTOL 10. The control device 60 is disposed as a part of the internal management unit 42. Details of the control device 60 will be described later.

The operation management system 40 further includes an operation planning device which is not shown. The operation planning device creates an operation plan of the eVTOL 10 based on, for example, information input from a terminal which is not shown. The input information includes, for example, information related to a departure point, and an arrival point. The operation planning device may create the operation plan in consideration of the battery information and the weather information.

<Control Device>

As described above, the program 203P constructs the control device 60 which is the functional unit by causing the processor 201 to execute multiple instructions. The control device 60 performs the flight control for causing the eVTOL 10 to fly, in a flight state corresponding to an operation performed by a pilot which is an operator, a remote operation performed by the operator, or control performed by a control system. The control device 60 includes a determination unit 61 and a flight control unit 62.

As to be described later, the determination unit 61 performs a predetermined determination based on the information acquired from the information acquisition device 50 or the like. The determination unit 61 determines, for example, based on the acquired device information, whether an abnormality has been predicted or detected for at least one of the driving devices 15. The determination unit 61 determines whether the eVTOL 10 is in a flight state or during the cruising time based on, for example, the flight information. The determination unit 61 determines whether safe flight is possible based on the flight information, the weather information, and the information such as regulations and rules. The determination unit 61 performs a determination for selecting a flight control mode.

The flight control unit 62 performs the flight control in a predetermined control mode based on a determination result of the determination unit 61. The flight control unit 62 selects and performs one of normal control, the lift adjustment control, and emergency landing control. The flight control unit 62 includes a rotary wing control unit 621 and a fixed wing control unit 622.

The rotary wing control unit 621 performs a process of controlling driving of the rotary wings 13. The rotary wing control unit 621 adjusts the rotational lift by controlling the driving of the rotary wings 13. The rotary wing control unit 621 performs a process of generating a control signal indicating a target rotational speed of each rotary wing 13 for realizing an instructed flight state. The rotary wing control unit 621 outputs the control signal indicating the target rotational speed to a driving circuit (driver) (not shown) that drives the inverter of the EPU 152. The driving circuit drives the motor of the EPU 152 via the inverter such that a rotational speed of the rotary wing 13 matches the target rotational speed.

The fixed wing control unit 622 controls driving of the lift adjustment mechanism 14 to adjust the gliding lift generated by the fixed wing 12. As an example, the fixed wing control unit 622 of the present embodiment performs a process of generating a control signal indicating a target tilt angle of each rotary wing 13 for realizing an instructed flight state. The fixed wing control unit 622 outputs the control signal indicating the target tilt angle to a driving circuit (not shown) that drives the inverter of the tilt adjustment device. The driving circuit drives the motor of the tilt adjustment device via the inverter such that a tilt angle of the rotary wing 13 matches the target tilt angle.

Similarly, the fixed wing control unit 622 performs a process of generating a control signal indicating a target position of each flap 142 for realizing an instructed flight state. The fixed wing control unit 622 outputs the control signal indicating the target position to a driving circuit (not shown) that drives the inverter of the flap adjustment device. The driving circuit drives the motor of the flap adjustment device via the inverter such that a position of the flap 142 coincides with the target position.

The control device 60 performs the normal control when the abnormality of the driving device 15 is not predicted or detected. When the abnormality of the driving device 15 is predicted or detected, the control device 60 performs the lift adjustment control for adjusting the rotational lift and the gliding lift in the normal control. In the lift adjustment control, the rotary wing control unit 621 reduces the rotational lift in the normal control, that is, in a case where an abnormality is not predicted or detected. The fixed wing control unit 622 increases the gliding lift in the normal control, that is, in the case where an abnormality is not predicted or detected. The control device 60 performs the emergency landing control when the abnormality of the driving device 15 is predicted or detected and an execution condition of the lift adjustment control is not satisfied.

<Operation Management Method>

Figure 5:
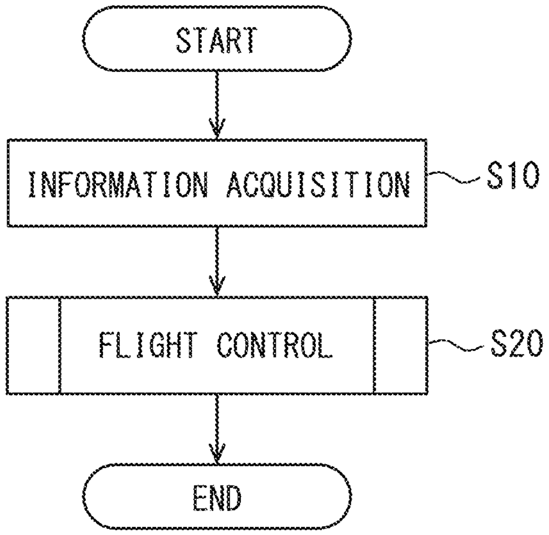
FIG. 5 is a flowchart showing an example of an operation management method.

FIG. 5 is a flowchart showing an example of an operation management method for the operation management system 40 to manage the operation of the eVTOL 10. Performing the process in each functional block of the operation management system 40 by the processors 201 and 311 corresponds to performing the operation management method.

The operation management system 40 repeatedly performs a process shown in FIG. 5 at a predetermined cycle during a flight time of the eVTOL 10. The flight time means a period from the start of take-off to the completion of landing, that is, a period including the above-described periods P1, P2, and P3.

First, the information acquisition device 50 acquires information related to the flight, that is, the related information (step S10). As an example, in the present embodiment, a part of the necessary information, for example, the information such as regulations and rules is acquired in an initial stage of periodic information acquisition. Another part of the necessary information, for example, the weather information and the information related to the current flight in the flight information are periodically acquired. The flight information is acquired at a timing when step S10 is performed, that is, a timing when the process shown in FIG. 5 is performed at a predetermined cycle. The weather information may be acquired in the same cycle as the flight information, or may be acquired once in multiple cycles with respect to the acquisition cycle of the flight information.

The device information may be acquired in the same cycle as the flight information during the flight time of the eVTOL 10, or may be acquired once in multiple cycles with respect to the acquisition cycle of the flight information. Regarding the device information, the information may be acquired only in a predetermined period during the flight. During the predetermined period, the device information may be acquired in the same cycle as the flight information, or may be acquired once in multiple cycles with respect to the acquisition cycle of the flight information.

As an example, in the present embodiment, the device information is acquired once in multiple cycles with respect to the acquisition cycle of the flight information during the flight time of the eVTOL 10. Further, as the device information, the information of each of the multiple batteries 151 is acquired from the BMS 16. When the BMS 16 predicts the abnormality of the battery 151, the abnormality prediction information is acquired. When the BMS 16 detects the abnormality of the battery 151, the abnormality detection information is acquired. In the present embodiment, the information related to the low SOC abnormality and/or the information related to the high temperature abnormality is acquired as the information related to the abnormality of the battery 151. When the BMS 16 does not predict or detect the abnormality of the battery 151, information indicating that the battery 151 is normal is acquired.

Next, the control device 60 performs the flight control based on the information acquired in step S10 (step S20). After step S20 is performed, the series of processes ends. Next, a flight control method will be described.

<Flight Control Method>

Figure 6:
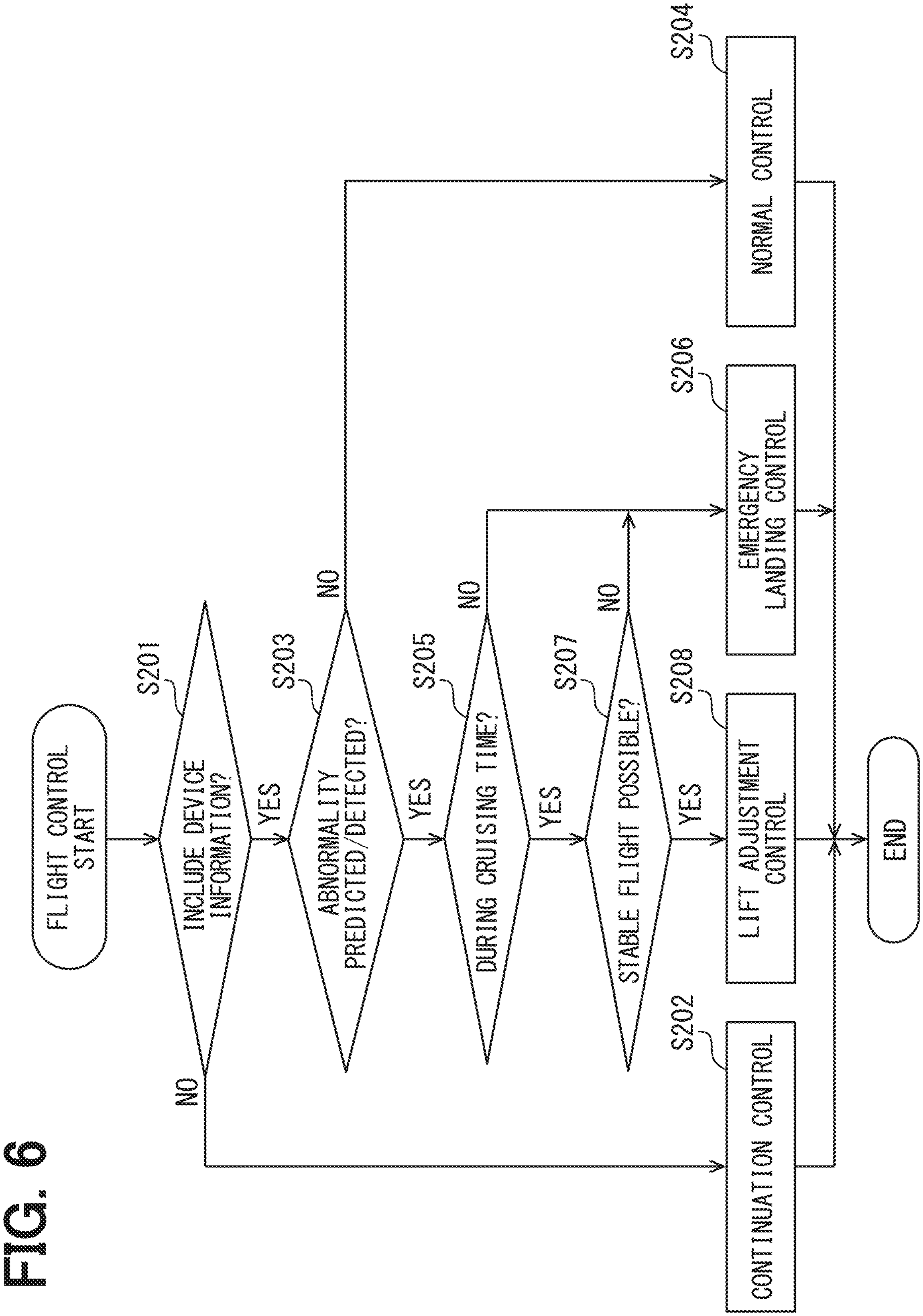
FIG. 6 is a flowchart showing an example of a flight control method.

FIG. 6 shows the process in step S20, that is, the flight control method. Performing the processing of each functional block of the control device 60 by the processor 201 corresponds to performing the flight control method.

When acquiring the related information, the control device 60 performs the process shown in FIG. 6. That is, the control device 60 repeatedly performs the process shown in FIG. 6 at a predetermined cycle.

First, the determination unit 61 of the control device 60 determines whether the device information is included based on the acquired related information (step S201). When the device information is not included, the flight control unit 62 of the control device 60 performs continuation control (step S202).

In the continuation control, the flight control unit 62 continues control in the control mode set (selected) during execution of previous control. For example, when the normal control mode is set during the execution of the previous control, the normal control is continued. When the lift adjustment control mode is set, the lift adjustment control is continued. When the process in step S202 is performed, the control device 60 ends the series of processes.

When the device information is included in step S201, the determination unit 61 then determines, based on the acquired device information, whether the abnormality prediction information or the abnormality detection information of the driving devices 15 is acquired (step S203). The determination unit 61 determines whether the abnormality prediction information or the abnormality detection information is acquired for at least one of the driving devices 15. As an example, the determination unit 61 determines whether the abnormality prediction information or the abnormality detection information of the battery 151 is acquired. When the abnormality prediction information or the abnormality detection information is not acquired, the flight control unit 62 performs control in the normal control mode, that is, the normal control (step S204).

In the normal control mode, the flight control unit 62 performs flight control such that the eVTOL 10 achieves a flight state corresponding to an instruction from the operator or the control system. The rotary wing control unit 621 and the fixed wing control unit 622 control the driving of the rotary wings 13 and the driving of the lift adjustment mechanism 14 such that the eVTOL 10 achieves the instructed predetermined flight state. When the process in step S204 is performed, the control device 60 ends the series of processes.

When the abnormality prediction information or the abnormality detection information is acquired for at least one of the driving devices 15, the determination unit 61 then determines, based on the flight information related to the current flight, whether the eVTOL 10 is during the cruising time (period P2) (step S205). When the eVTOL 10 is not during the cruising time, that is, when the execution condition of the lift adjustment control is not satisfied, the flight control unit 62 performs control in the emergency landing control mode, that is, the emergency landing control (step S206). For example, in a case of the take-off time (period P1), the flight control unit 62 controls the driving of the rotary wings 13 and the lift adjustment mechanism 14 such that the eVTOL 10 performs emergency landing. When the process in step S206 is performed, the control device 60 ends the series of processes.

When the eVTOL 10 is during the cruising time, the determination unit 61 then determines, based on the acquired necessary information, whether the stable flight is possible when the lift adjustment control is performed (step S207). The determination unit 61 determines whether it is possible to maintain a thrust and a total lift at which a stable flight is possible within a predetermined altitude range and a predetermined flight speed range, when the lift adjustment control is performed. In a case where the stable flight is not possible when the lift adjustment control is performed, the flight control unit 62 performs the process in step S206, that is, the emergency landing control, and ends the series of processes.

When the stable flight is possible, the flight control unit 62 then performs control in the lift adjustment control mode, that is, the lift adjustment control (step S208). When the process in step S208 is performed, the control device 60 ends the series of processes.

The flight control unit 62 performs the lift adjustment control under conditions of the flight information, the weather information, and conditions in which a safe and stable flight is possible. The flight control unit 62 performs the lift adjustment control while maintaining the thrust and the total lift at which the stable flight is possible within the predetermined altitude range and the predetermined flight speed range. In the lift adjustment control mode, the flight control unit 62 performs flight control, which is different from the instruction from the operator or the control system, on at least the rotary wing 13 on which an abnormality is predicted or detected.

The rotary wing control unit 621 controls the driving of the rotary wing 13 such that the rotational lift is smaller than that when the normal control corresponding to the instruction is temporarily performed. The rotary wing control unit 621 reduces the rotational lift within a range in which the stable flight is possible. The number of the rotary wings 13 in which the rotational lift is reduced is not particularly limited as long as the stable flight is possible. The rotary wing control unit 621 reduces the rotational lift of at least the rotary wing 13 driven by the driving device 15 in which the abnormality is predicted or detected. Accordingly, the rotational lift is reduced for the eVTOL 10 as a whole.

In the lift adjustment control mode, the rotary wing control unit 621 may reduce the rotational lift of only the rotary wing 13 driven by the driving device 15 in which the abnormality is predicted or detected. The remaining rotary wings 13 may be controlled, for example, in the same manner as in the normal control. The rotary wing control unit 621 may reduce the rotational lift of at least a part of the multiple rotary wings 13 including the rotary wing 13 which is driven by the driving device 15 in which the abnormality is predicted or detected. For example, in order to balance the flight, the rotational lift of the rotary wing 13 driven by the driving device 15 in which the abnormality is predicted or detected and the rotary wing 13 at a symmetrical position may be reduced.

The rotary wing control unit 621 reduces the rotational lift by, for example, decreasing the rotational speed of the rotary wing 13. Instead, the rotational lift may be reduced by stopping the rotation of the rotary wing 13. A load on the driving device 15 can be reduced by decreasing the rotational speed of the rotary wing 13 or stopping the rotation. Thus, a temperature of the driving device 15 can be decreased, and SOC consumption of the battery 151 can be reduced.

The fixed wing control unit 622 controls the driving of the lift adjustment mechanism 14 such that the gliding lift is larger than the gliding lift when the normal control corresponding to the instruction is temporarily performed. The fixed wing control unit 622 increases the gliding lift within a range in which the stable flight is possible. The fixed wing control unit 622 controls driving of the tilt mechanism 141 to increase a distribution of the thrust in the propulsive force of the rotary wings 13, for example. As the thrust increases, the wing speed V can be increased and the gliding lift can be increased. The fixed wing control unit 622 controls, for example, the flap 142 to the lower position. Accordingly, the gliding lift acting on the main wing 121 can be increased. The flap 142 may be moved in a direction protruding from the main wing 121. The gliding lift can be further increased.

According to the flight control method described above, it is determined whether the abnormality prediction information or the abnormality detection information of the driving device 15 is acquired, and if not acquired, the normal control is performed. Thus, when the abnormality of the driving device 15 is eliminated by performing the lift adjustment control, the lift adjustment control can be cancelled and returned to the normal control. Instead of immediately returning to the normal control when the abnormality is eliminated, a predetermined margin may be provided. For example, the control may be switched to the normal control when it is determined for the target driving device 15 that the abnormality is eliminated and the abnormality does not occur again during the remaining flight.

In the flight control method described above, the thrust and the rotational lift required for the stable flight may be secured by the continuous operation, the increase in the rotational speed, or the like of the rotary wing 13 driven by the driving device 15 in which the abnormality is not predicted or detected. That is, the reduction of the rotational lift in a part of the rotary wings 13 may be compensated for by others of the rotary wings 13. During the lift adjustment control, the rotary wing control unit 621 may perform control such that the thrust of the rotary wing 13 driven by the driving device 15 in which the abnormality is not predicted or detected increases. Accordingly, the wing speed V can be increased and the gliding lift can be increased. Accordingly, the lift adjustment control can be performed for a long time, and a possibility of preventing or eliminating the abnormality can be increased.

In order to reduce the thrust required for the flight, the drag D may be reduced. For example, if the stopped rotary wing 13 is accommodated inside the airframe main body 11 or inside the fixed wing 12, the drag D can be reduced and the required thrust can be reduced. This also enables the lift adjustment control to be performed for a long time.

As long as the thrust and the total lift at which the stable flight is possible within the predetermined altitude range and the predetermined flight speed range can be maintained, the flight may be performed only by the gliding lift. A target value of the lift adjustment control may be set according to a deviation value between a level of an abnormal value predicted or detected for the abnormality and a normal value, and a control plan of the lift adjustment control may be created and executed. For example, the control plan can be created based on the remaining operation plan and history information of the past flight and the lift adjustment control.

<Summary of First Embodiment>

As described above, the control device 60 of the present embodiment includes the rotary wing control unit 621 which adjusts the rotational lift by controlling the driving of the rotary wing 13, and the fixed wing control unit 622 which adjusts the gliding lift by controlling the driving of the lift adjustment mechanism 14. When an abnormality of the driving device 15 is predicted or detected during the flight time of the eVTOL 10 that is an electric flight vehicle, the rotary wing control unit 621 and the fixed wing control unit 622 perform the lift adjustment control such that the rotary wing control unit 621 reduces the rotational lift and the fixed wing control unit 622 increases the gliding lift.

In this way, when the abnormality of the driving device 15 is predicted or detected, the control device 60 reduces the rotational lift as compared with a case of performing the normal control. Accordingly, the load on the driving device 15 can be reduced, and the possibility of preventing or eliminating the abnormality can be increased. The control device 60 increases the gliding lift as compared with the case of performing the normal control, as the rotational lift is reduced. Since the reduction of the rotational lift is compensated for to some extent by the gliding lift, a reduction of the total lift can be limited. As a result, safety of the flight can be enhanced.

A timing when the lift adjustment control is performed during the flight time is not particularly limited. As an example, in the present embodiment, the lift adjustment control is performed during the cruising time. It is possible to increase the possibility of preventing or eliminating an abnormality before the landing requiring a high output. Thus, the safety of the flight can be enhanced.

During the take-off time, it is difficult to secure the gliding lift. As an example, in the present embodiment, the lift adjustment control is prohibited to be performed during the take-off time of the eVTOL 10. When the abnormality of the driving device 15 is predicted or detected, the control device 60 determines whether the eVTOL 10 is during the cruising time. When the eVTOL 10 is not during the cruising time, the lift adjustment control is not performed. Accordingly, it is possible to prevent the flight state from becoming unstable and secure the safety.

As an example, the control device 60 of the present embodiment performs the lift adjustment control while maintaining the thrust and the total lift at which the eVTOL 10 can stably fly within the predetermined altitude range and the predetermined flight speed range. The control device 60 performs the lift adjustment control based on the acquired information under the conditions that enable stable flight. Accordingly, a reduction in the load on the driving device 15 and stable flight can be both achieved.

If the thrust and the total lift cannot be maintained, the stability of flight cannot be secured during the cruising time. In such a case, the control device 60 performs control for landing the eVTOL 10, that is, the emergency landing control. Accordingly, a risk caused by continuing the cruising can be avoided.

As an example, when the abnormality of the driving device 15 is predicted or detected, the control device 60 of the present embodiment continues the lift adjustment control until the abnormality is eliminated as long as the stable flight is possible during the cruising time. The eVTOL 10 lands under the normal control after the abnormality is eliminated. In this way, since the landing is restricted until the characteristics of the driving device 15 required for the landing are satisfied, that is, the cruising is continued, the safety can be enhanced.

As described above, during the take-off time and the landing time, a high output continuous for a predetermined time is required to drive the rotary wing 13 of the eVTOL 10. Therefore, a temporary abnormality such as the temperature abnormality or the low SOC abnormality may occur. As an example, in the present embodiment, when an abnormality of the battery 151 is predicted or detected, the control device 60 performs the lift adjustment control. By reducing the rotational lift, a load of the battery 151 in which the abnormality is predicted or detected is reduced, and a possibility of preventing or eliminating the abnormality can be increased.

Figure 7:
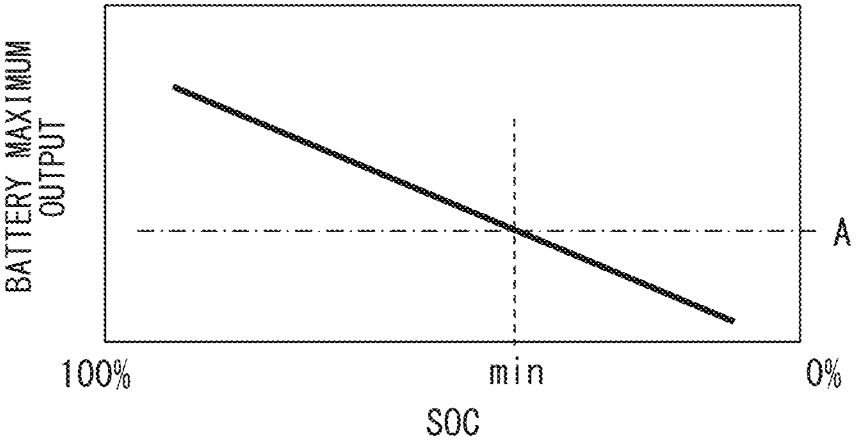
FIG. 7 is a diagram showing SOC dependence of a battery maximum output.

FIG. 7 shows SOC dependence of a maximum output of the battery 151 which can be output continuously for a predetermined time. min shown in FIG. 7 is a minimum SOC at which an output A required for the landing can be output continuously for a predetermined time, that is, a power amount required for the landing can be secured. For example, when min is 30%, the landing is possible when the SOC is 30% or more, and the landing is not possible when the SOC is less than 30%. Thus, an output performance of the battery 151 is affected by the SOC. As an example, in the present embodiment, the BMS 16 determines the SOC abnormality of the battery 151. The BMS 16 sets a value obtained by adding a predetermined margin to the SOC (corresponding to min) at which the landing is not possible as a threshold for abnormality determination, and determines the low SOC abnormality when the SOC falls below the threshold. The determination result is collected by the information acquisition device 50 of the operation management system 40.

The control device 60 performs the lift adjustment control when the low SOC abnormality of the battery 151 is predicted or detected. By the lift adjustment control, SOC consumption of the battery 151 in which the abnormality is predicted or detected can be limited, and a possibility of preventing or eliminating the low SOC abnormality can be increased. In the lift adjustment control, an output of the battery 151 in which the low SOC abnormality is predicted or detected may be stopped. The SOC consumption can be greatly reduced, and the safety of the flight can be enhanced by stopping an operation of the battery 151, in which the low SOC abnormality occurs, until the abnormality is eliminated.

The SOC can be calculated by estimation based on a map or the like using battery data. The battery data includes an open circuit voltage (OCV), a current, a voltage, and a temperature at the time of driving. The OCV is an abbreviation of the open circuit voltage. Accordingly, the low SOC abnormality can be predicted based on a fluctuation of the calculated value. The low SOC abnormality can be detected based on the calculated value.

The map, the output A, and the time are set based on, for example, data acquired during a test. Indication of the SOC dependence of the battery maximum output is not limited to the map. A landing power amount may be estimated using a battery model. The power profile is not limited to the example described above. Although an example in which the predetermined time and the power are constant has been described, the present invention is not limited thereto. The calculation may be performed based on a power profile which varies with time. In this case, the landing power amount may be obtained by integration, that is, interval integration.

As the temperature of the battery 151 increases, the battery cell is likely to deteriorate, and when the temperature further increases, thermal runaway occurs due to a reaction of a material inside the battery cell. As an example, in the present embodiment, the BMS 16 determines the temperature abnormality of the battery 151. The BMS 16 sets a threshold for high temperature abnormality determination, and determines the high temperature abnormality when the battery temperature exceeds the threshold. The determination result is collected by the information acquisition device 50 of the operation management system 40.

The control device 60 performs the lift adjustment control when the high temperature abnormality of the battery 151 is predicted or detected. By the lift adjustment control, the load of the battery 151 in which the abnormality is predicted or detected is reduced, and a possibility of preventing or eliminating the high temperature abnormality can be increased. In the lift adjustment control, an output of the battery 151 in which the high temperature abnormality is predicted or detected may be stopped. The load of the battery 151 can be greatly reduced, and the safety of the flight can be enhanced by stopping an operation of the battery 151, in which the high temperature abnormality occurs, until the abnormality is eliminated.

The operation management system 40 of the present embodiment includes the control device 60 and the information acquisition device 50 which acquires the information related to the flight of the eVTOL 10. When acquiring information indicating that the abnormality of the driving device is predicted or detected during the flight time as the information, the control device 60 reduces the rotational lift. Accordingly, the load on the driving device 15 can be reduced, and the possibility of preventing or eliminating the abnormality can be increased. The control device 60 increases the gliding lift as the rotational lift is reduced. Accordingly, a decrease in the lift can be limited. As a result, the safety of the flight can be enhanced.

A control program (program 203P) of the present embodiment includes causing at least one processor 201 (processing unit) to adjust the rotational lift by controlling the driving of the rotary wing 13, to adjust the gliding lift by controlling the driving of the lift adjustment mechanism 14, and to perform control to decrease the rotational lift and increase the gliding lift when the abnormality of the driving device 15 is predicted or detected during the flight time of the eVTOL 10. The program 203P reduces the rotational lift when the abnormality of the driving device 15 is predicted or detected. Accordingly, the load on the driving device 15 can be reduced, and the possibility of preventing or eliminating the abnormality can be increased. The gliding lift can be increased as the rotational lift is reduced. Accordingly, the decrease in the lift can be limited. As a result, the safety of the flight can be enhanced.

<Modification>

An example in which the lift adjustment control is performed when an abnormality of the battery 151 is predicted or detected as the driving device 15 has been described, but the present invention is not limited thereto. The lift adjustment control may be performed when an abnormality of the EPU 152 is predicted or detected. When the high temperature abnormality is predicted or detected based on a temperature of the motor and/or the inverter constituting the EPU 152, the rotational lift of the rotary wing 13 which is a driving target of the EPU 152 is reduced and the gliding lift is increased. The temperature can be decreased by reducing or stopping an output of the EPU 152. Thus, the possibility of preventing or eliminating the high temperature abnormality can be increased. Of course, the lift adjustment control may be performed when an abnormality of at least one of the battery 151 and the EPU 152 is predicted or detected.

The control device 60 may control the auxiliary machine such as the air conditioner. The control device 60 acquires, from each sensor mounted in the airframe, inside air information indicating an internal temperature and humidity and outside air information indicating an external temperature and humidity. The control device 60 acquires setting information such as a set temperature set by an input terminal. The control device 60 may switch the control mode of the auxiliary machine, which controls the air conditioner, based on the inside air information, the outside air information, and the setting information. The control device 60 configured as described above may control the auxiliary machine such as the air conditioner such that the SOC consumption is limited at the time of the low SOC abnormality. The control device 60 may control the auxiliary machine such as the air conditioner such that the temperature of the battery 151 is increased by internal heat generation at the time of the low temperature abnormality. In this way, by performing auxiliary machine control corresponding to the lift adjustment control, the possibility of preventing or eliminating an abnormality can be further increased.

When the generator is provided in the aircraft, the control device 60 may control the generator. The control device 60 may control the generator to supply electric power to the target battery 151 at the time of the low SOC abnormality. Accordingly, the SOC consumption can be limited. In this way, by performing generator control corresponding to the lift adjustment control, the possibility of preventing or eliminating an abnormality can be further increased.

The control device 60 may be configured to perform at least the processes in steps S203, S204, and S208 shown in FIG. 6. For example, the device information may be acquired in the same cycle as the flight information during the flight time of the eVTOL 10. In this case, the processes in steps S201 and S202 are unnecessary. When an execution timing of the lift adjustment control is not limited, the process in step S205 is unnecessary. When flight stability during the cruising time is not taken into consideration, the process in step S206 is unnecessary. When steps S205 and S206 are unnecessary, step S208 is also unnecessary. When the eVTOL 10 is not during the cruising time in step S205, the normal control may be performed. However, when the abnormality continues, the emergency landing control may be performed.

Figure 8:
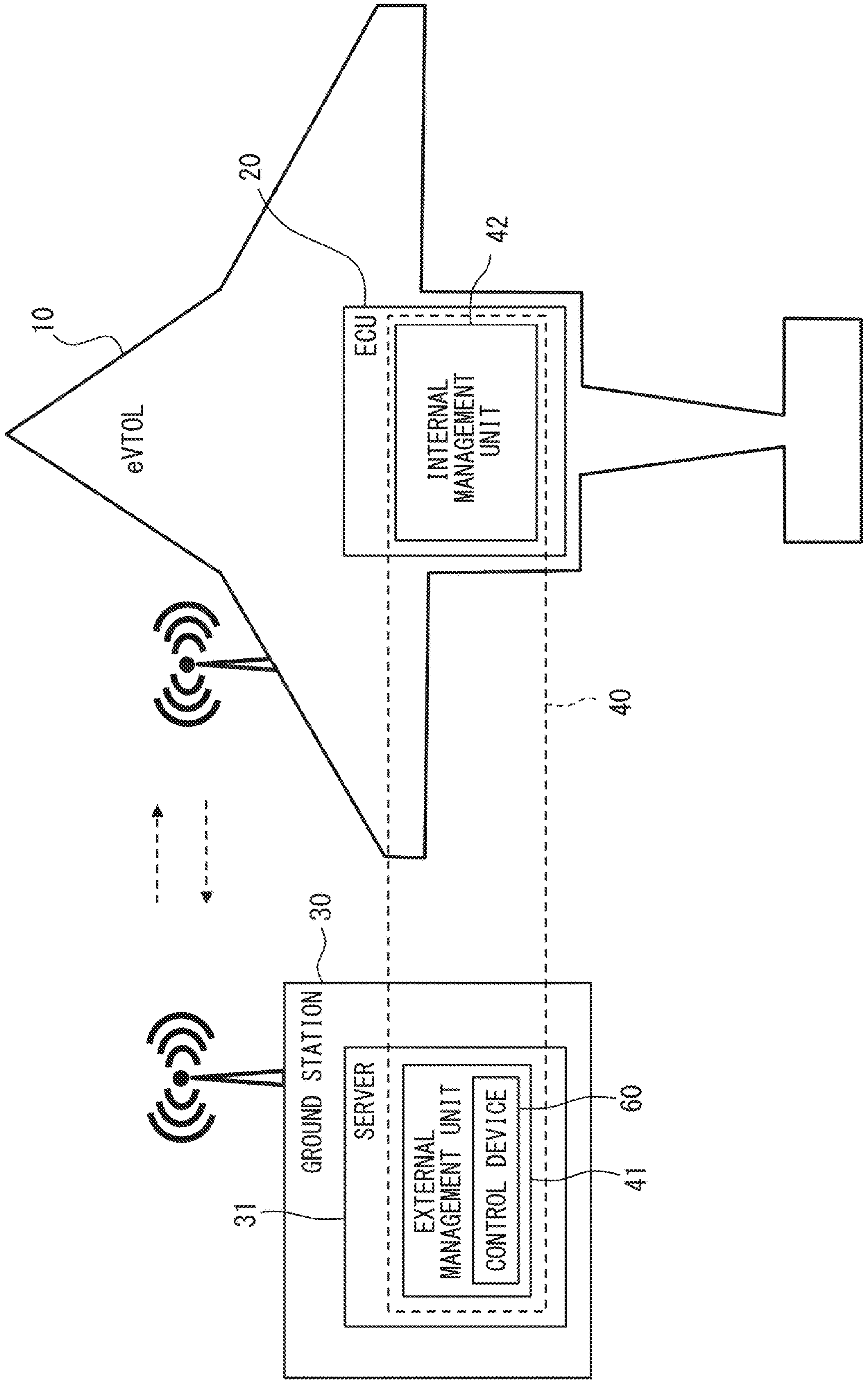
FIG. 8 is a diagram showing a modification.

Although an example in which the internal management unit 42 includes the control device 60 has been described, the present invention is not limited thereto. As shown in FIG. 8, the external management unit 41 may include the control device 60. The ECU 20 may include the information acquisition device 50 and the control device 60, or the server 31 may include the information acquisition device 50 and the control device 60. The ECU 20 may include one of the information acquisition device 50 and the control device 60, and the server 31 may include the other of the information acquisition device 50 and the control device 60.

An example in which the batteries 151 are redundantly provided for the EPU 152 and hence the rotary wing 13 has been described, but the present invention is not limited thereto. The batteries 151 may be provided one for each EPU 152 (rotary wing 13).

Second Embodiment

This embodiment is a modification of a basic aspect of the preceding embodiment, and the description of the preceding embodiment can be incorporated. In the preceding embodiment, the operation management system 40 acquires the abnormality prediction information or the abnormality detection information of the battery 151 from the outside (BMS 16). Instead, the operation management system 40 may have a function of monitoring the state of the battery 151.

Figure 9:
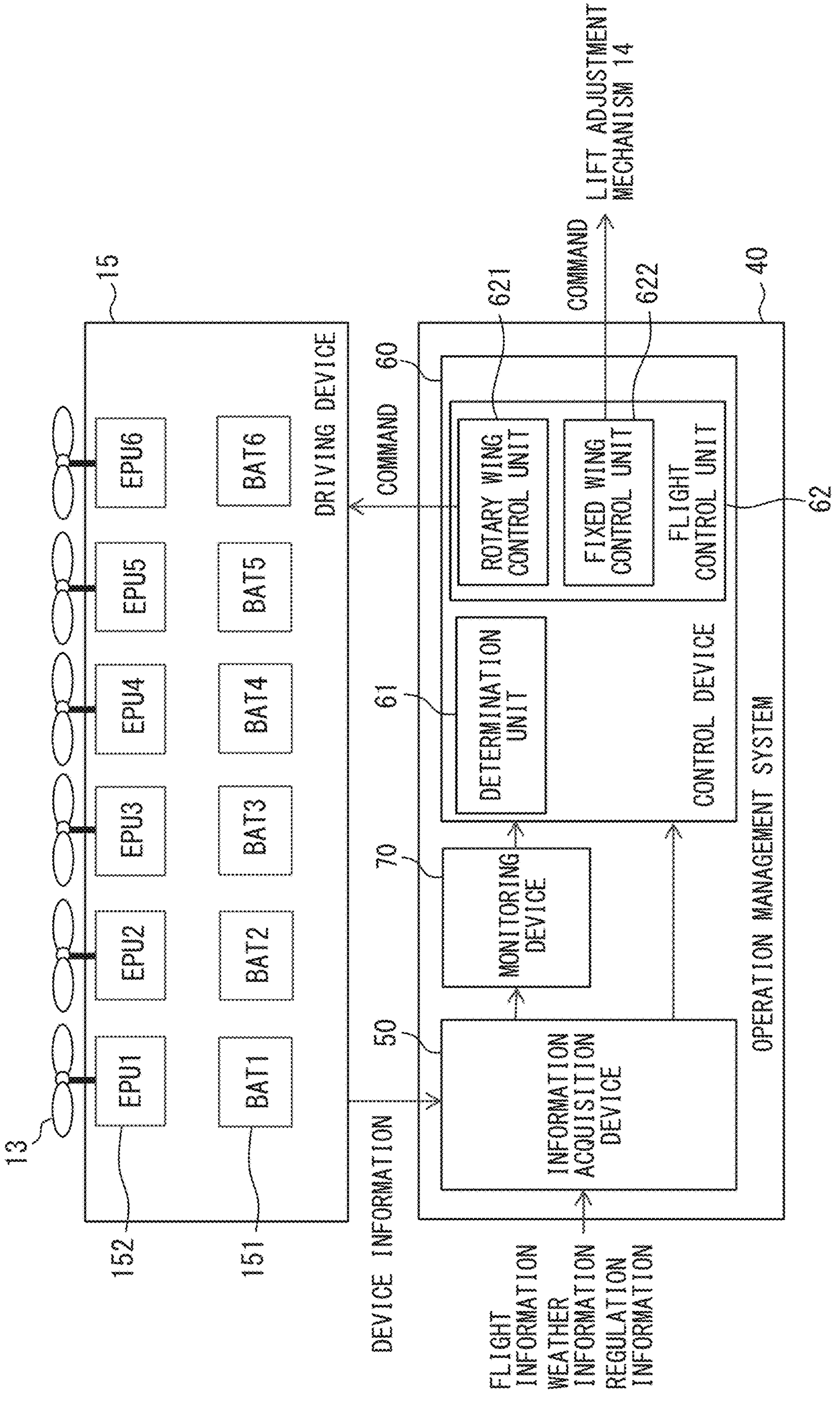
FIG. 9 is a diagram showing a schematic configuration of the operation management system in a second embodiment.

FIG. 9 is a diagram showing a schematic configuration of the operation management system in the present embodiment. FIG. 9 corresponds to FIG. 4. As shown in FIG. 9, the operation management system 40 includes a monitoring device 70 that monitors a state of the driving device 15. For example, the information acquisition device 50 may acquire SOC information or temperature information from the BMS 16, and the monitoring device 70 may perform abnormality prediction or abnormality detection based on the acquired information. The information acquisition device 50 may acquire the battery data from the BMS 16, and the monitoring device 70 may perform the SOC estimation, the abnormality prediction, or the abnormality detection based on the acquired battery data. Other configurations are the same as those described in the preceding embodiment.

Summary of Second Embodiment

As described above, the operation management system 40 of the present embodiment can predict or detect an abnormality of the driving device 15 based on the device information. When the abnormality of the driving device 15 is predicted or detected, the lift adjustment control can be performed.

Third Embodiment

This embodiment is a modification of a basic aspect of the preceding embodiment, and the description of the preceding embodiment can be incorporated. In the preceding embodiment, the lift adjustment control is performed over the entire cruising period. However, the lift adjustment control is not limited to being performed at the above-described timing.

Figure 10:
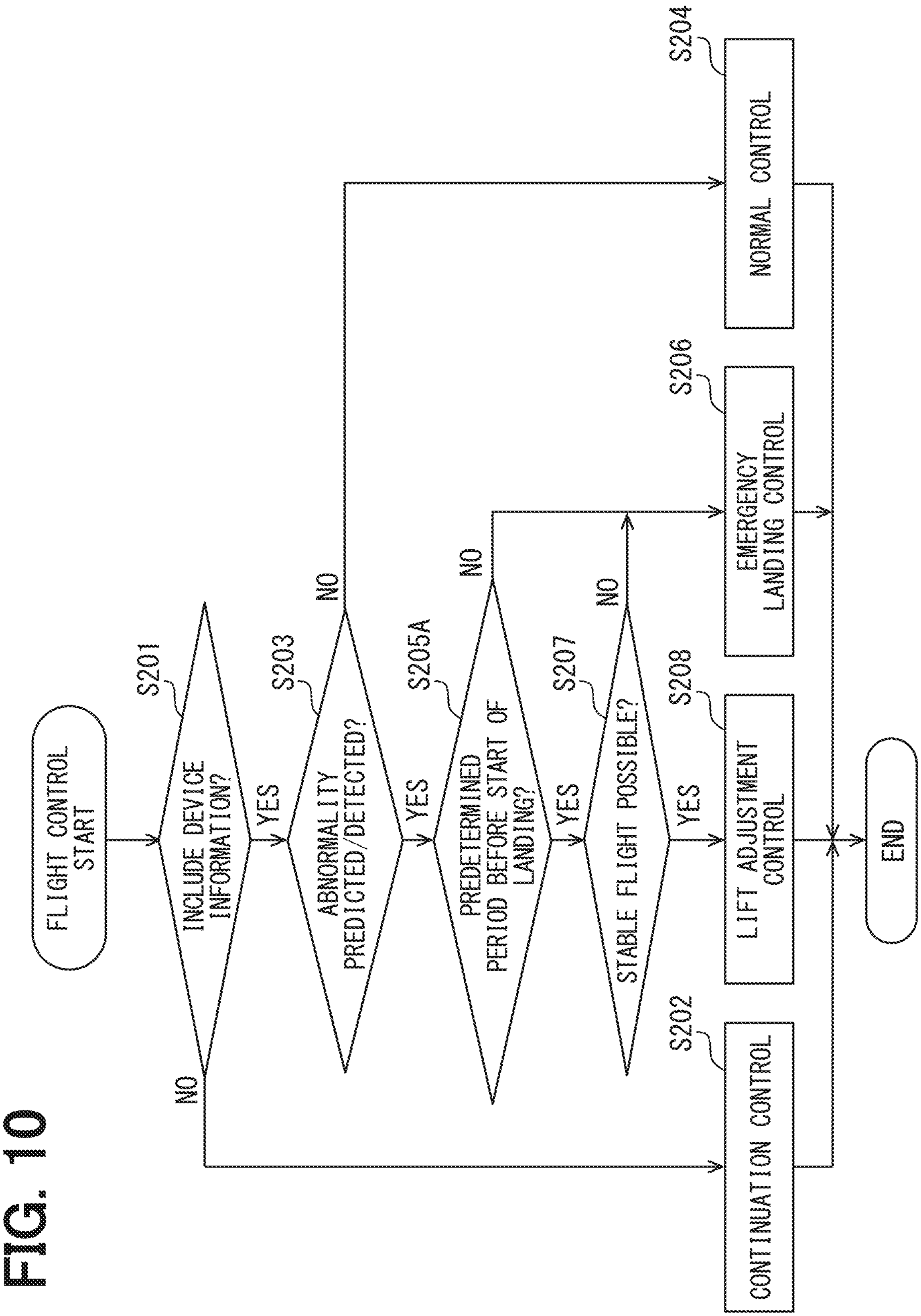
FIG. 10 is a flowchart showing the flight control method in a third embodiment.

FIG. 10 is a flowchart showing the flight control method according to the present embodiment. As shown in FIG. 10, the control device 60 performs a process in step S205A instead of the process in step S205.

In step S205A, the determination unit 61 of the control device 60 determines whether the eVTOL 10 is during the cruising time and is at least a predetermined period before the start of landing. As described above, it takes a predetermined time from when the rotation of the rotary wing 13 driven by the driving device 15 in which the abnormality is predicted or detected is restricted to when the predicted or detected abnormality is eliminated. The predetermined time is determined based on, for example, past flight information (history information), data from prototypes, and the like. Other configurations are the same as those described in the preceding embodiment.

<Summary of Third Embodiment>

When the lift adjustment control is started at a timing that is a predetermined period before the start of landing, for example, at a timing that is relatively close to the start of landing, there is a possibility that a sufficient time for eliminating the low SOC abnormality or the high temperature abnormality cannot be secured before the start of landing.

According to the present embodiment, the lift adjustment control is performed at least a predetermined time before the start of landing during the cruising time. Accordingly, the possibility of preventing/eliminating the abnormality before the start of landing can be increased.

Figure 11:
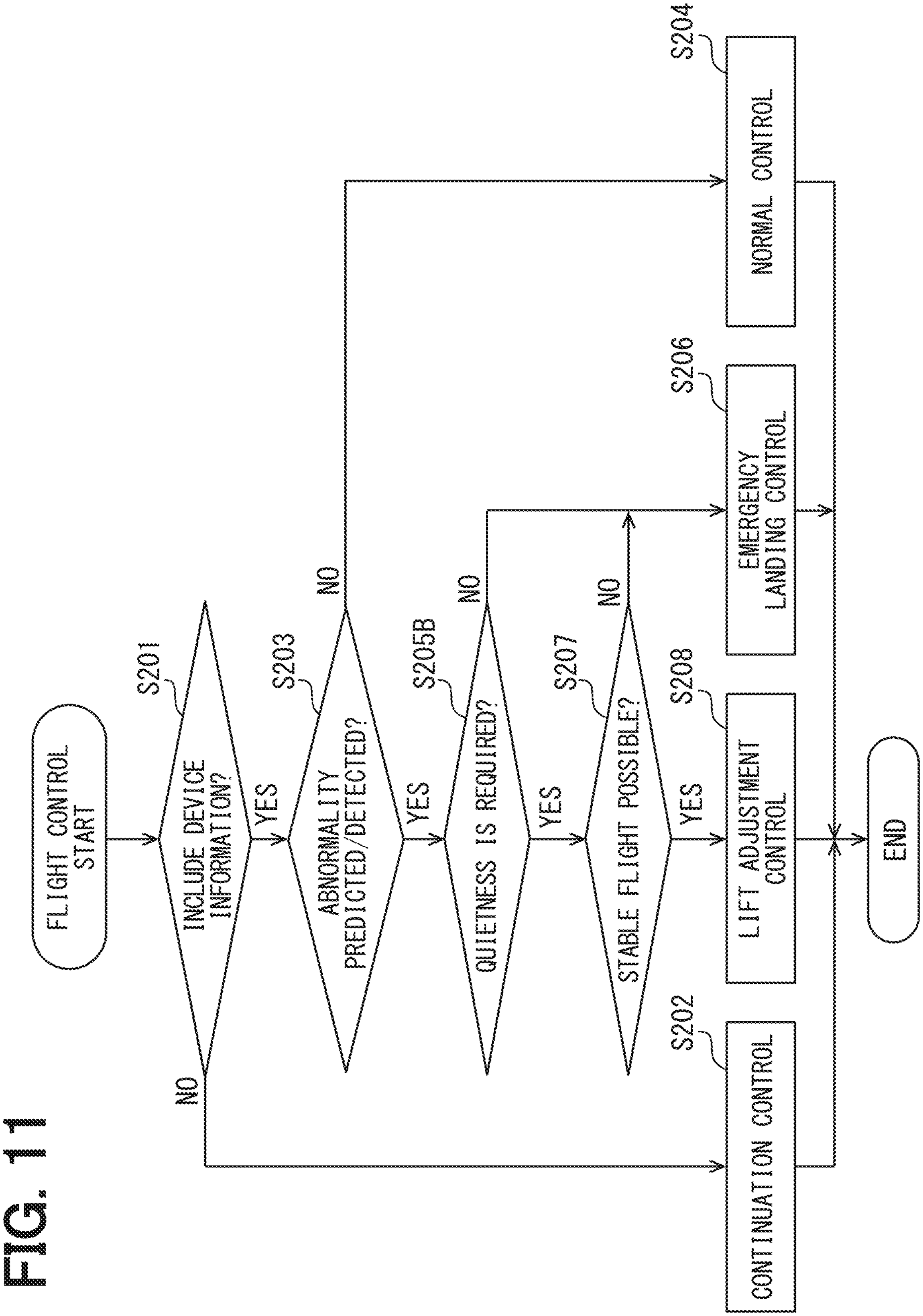
FIG. 11 is a diagram showing a modification.

Instead of the process in step S205, a process in step S205B shown in FIG. 11 may be performed. In step S205B, the determination unit 61 of the control device 60 determines whether the eVTOL 10 is during the cruising time and during the flight time in a quietness required area, that is, whether quietness is required. By performing the lift adjustment control for reducing the rotational speed of the rotary wing 13 or stopping the rotation when the quietness is required, the efficiency in response to a quietness request can be improved.

The processes in step S205A and step S205B may be combined. That is, the lift adjustment control may be performed during the cruising time, a predetermined period before the start of landing, and during the flight time in the quietness required area.

The configuration described in the present embodiment may be combined with the configurations described in the first embodiment and the second embodiment.

Fourth Embodiment

This embodiment is a modification of a basic aspect of the preceding embodiment, and the description of the preceding embodiment can be incorporated. In the preceding embodiment, the lift adjustment control is performed during the cruising time. Instead, the lift adjustment control may be performed during the landing time.

Figure 12:
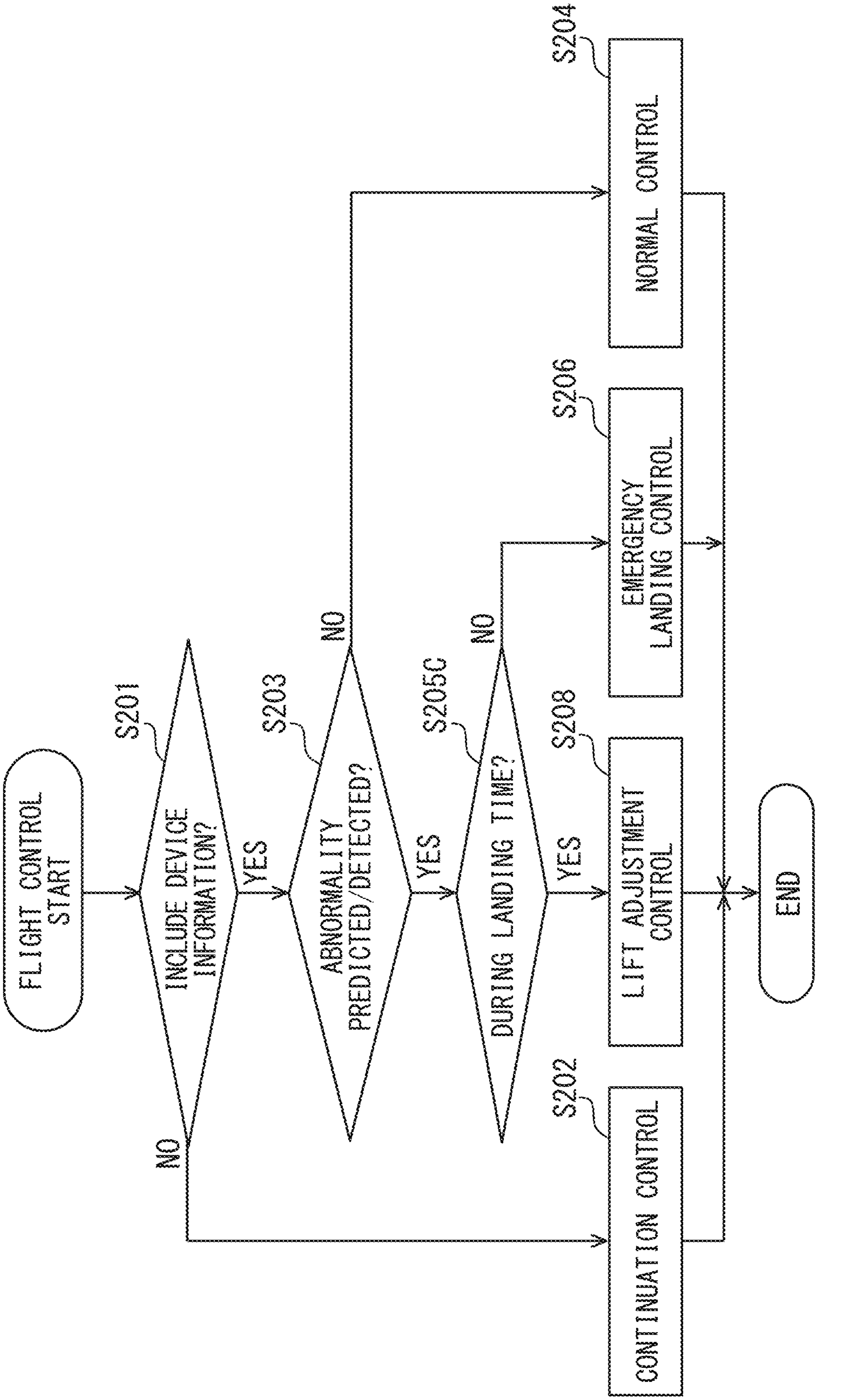
FIG. 12 is a flowchart showing the flight control method in a fourth embodiment.

FIG. 12 is a flowchart showing the flight control method according to the present embodiment. As shown in FIG. 12, the control device 60 performs a process in step S205C instead of the process in step S205. In step S205C, the determination unit 61 of the control device 60 determines whether the eVTOL 10 is during the landing time (period P3). When the eVTOL 10 is during the landing time, the flight control unit 62 then performs the process in step S208, that is, the lift adjustment control. When the eVTOL 10 is not during the landing time, that is, during the take-off time or the cruising time, the emergency landing control is performed. Other configurations are the same as those described in the preceding embodiment.

<Summary of Fourth Embodiment>

According to the present embodiment, the lift adjustment control is performed during the landing time. Unlike during the cruising time, the speed is reduced as the landing is performed during the landing time, making it easier to increase the gliding lift. Thus, by performing the lift adjustment control during the landing time, safety of the landing can be enhanced while reducing the load of the driving device 15 in which the abnormality is predicted or detected.

<Modification>

Although not particularly mentioned in the preceding embodiment, in the emergency landing control performed during the take-off time or the cruising time, similarly to the lift adjustment control, the rotational lift may also be reduced and the gliding lift may also be increased with respect to the normal control. Accordingly, safety of emergency landing can be enhanced while reducing the load of the driving device 15 in which the abnormality is predicted or detected.

The configuration described in the present embodiment may be combined with the configurations described in the first embodiment, the second embodiment and the third embodiment. For example, the lift adjustment control may be performed during the cruising time or during the landing time instead of being performed only during the landing time.

Fifth Embodiment

This embodiment is a modification of a basic aspect of the preceding embodiment, and the description of the preceding embodiment can be incorporated. In the preceding embodiment, the lift adjustment control is performed when the low SOC abnormality and/or the high temperature abnormality of the battery 151 is predicted or detected. Instead, the lift adjustment control may be performed when the battery 151 has the low temperature abnormality.

Figure 13:
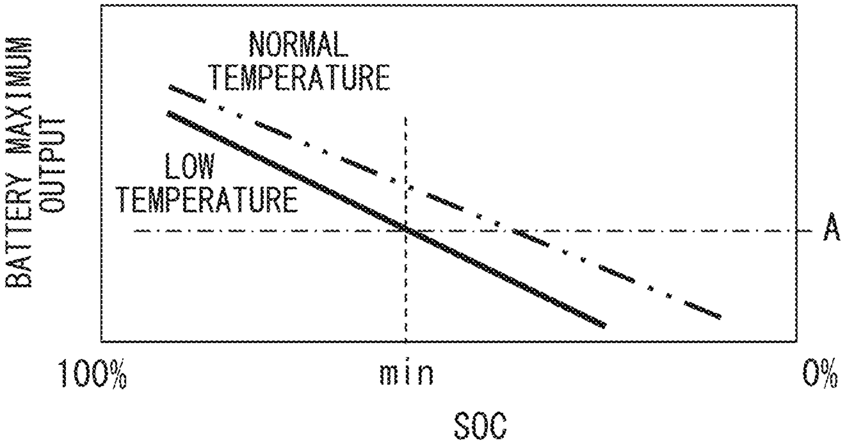
FIG. 13 is a diagram showing a relationship between the SOC dependence of the battery maximum output and a battery temperature.

Similar to FIG. 7, FIG. 13 shows the SOC dependence of the maximum output of the battery 151 which can be output continuously for a predetermined time. FIG. 13 shows an influence of the battery temperature. As shown in FIG. 13, the output performance of the battery 151 is affected by the battery temperature. A solid line shown in FIG. 13 indicates a low temperature state in which the battery temperature decreases with respect to a normal temperature indicated by a two-dot chain line. When the battery temperature decreases, an internal resistance of the battery 151 increases and the output decreases. In this way, a minimum SOC required to continuously output the output A for a predetermined time varies in response to the battery temperature. For example, due to the temperature decrease, the minimum SOC increases as compared with that before the temperature decreases.

As an example, the BMS 16 of the present embodiment actually measures or estimates the battery temperature and predicts or detects the temperature abnormality. The BMS 16 sets, based on a change in battery internal resistance caused by the battery temperature, a threshold for determining the low temperature abnormality of the battery 151, and determines the low temperature abnormality when the battery temperature falls below the threshold. The determination result is collected by the information acquisition device 50 of the operation management system 40. Regarding the battery temperature, the battery temperature can be actually measured, can be calculated by estimation from actually measured temperature data of a part of the battery cells, or can be estimated from output data or the like using a battery reaction model or the like. Accordingly, the temperature abnormality can be predicted based on a variation in the actually measured value or the estimated value. The temperature abnormality can be detected based on the actually measured value or the estimated value.

Figure 14:
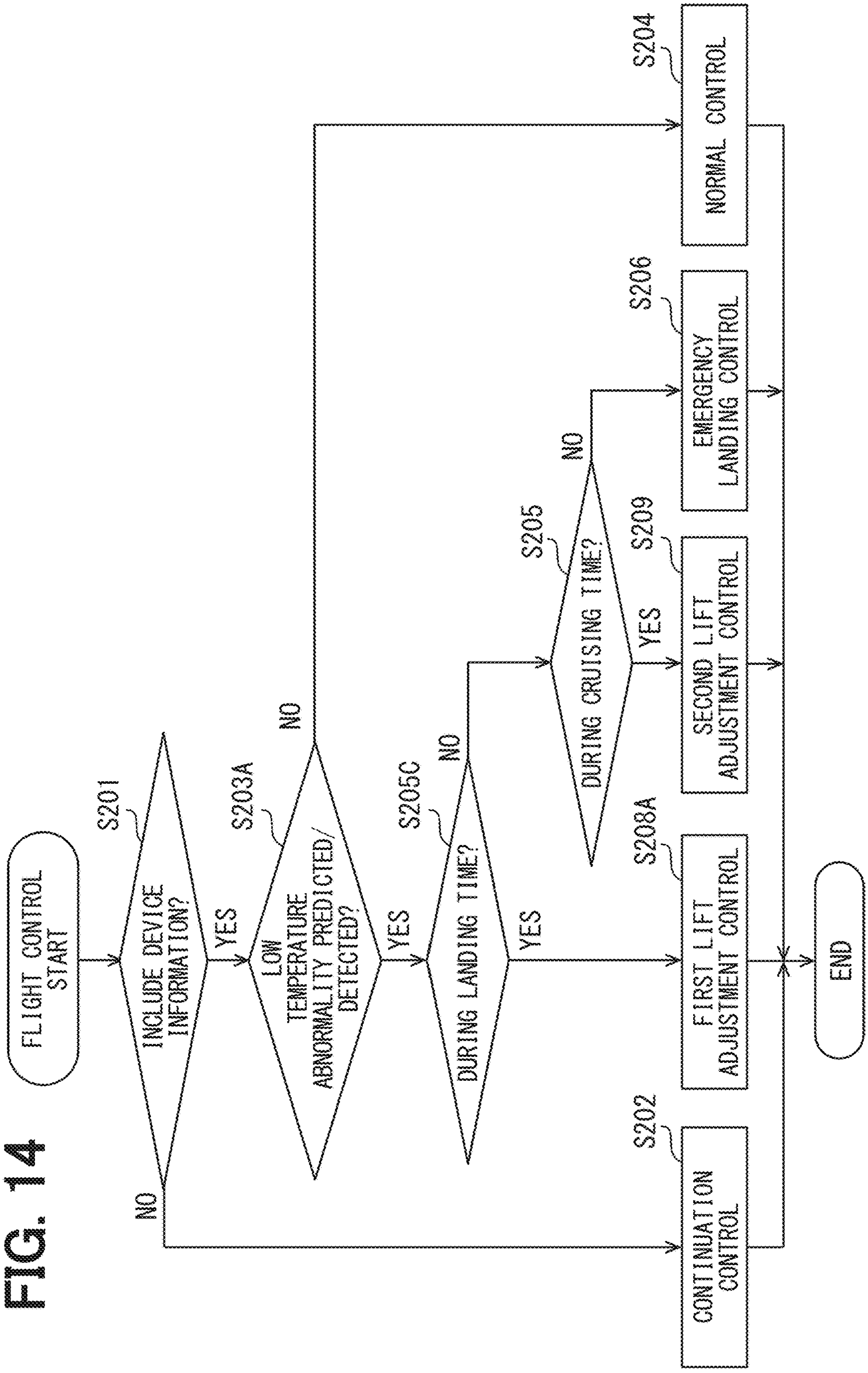
FIG. 14 is a flowchart showing a flight control method in a fifth embodiment.

FIG. 14 is a flowchart showing the flight control method when the abnormality of the driving device 15 is the low temperature abnormality of the battery 151. The control device 60 performs a process in step S203A instead of step S203. In step S203A, it is determined, based on the acquired device information, whether low temperature abnormality prediction information or low temperature abnormality detection information of the battery 151 is acquired. When the low temperature abnormality prediction information or the low temperature abnormality detection information is not acquired, the flight control unit 62 performs the process in step S204, that is, the normal control.

When the low temperature abnormality prediction information or the low temperature abnormality detection information is acquired in step S203A, the determination unit 61 then performs the process in step S205C, that is, the process of determining whether the eVTOL 10 is during the landing time. When the eVTOL 10 is during the landing time, the flight control unit 62 performs first lift adjustment control (step S208A). The first lift adjustment control corresponds to the lift adjustment control described in the preceding embodiment. The control device 60 performs the lift adjustment control (first lift adjustment control) for reducing the rotational lift and increasing the gliding lift in the case of the landing time due to the low temperature abnormality. When the process in step S208A is executed, the series of processes ends.

When it is determined in step S205C that the eVTOL 10 is not during the landing time, the determination unit 61 performs the process in step S205, that is, the process of determining whether the eVTOL 10 is during the cruising time. When the eVTOL 10 is during the cruising time, the flight control unit 62 performs second lift adjustment control (step S209). Unlike the first lift adjustment control, the second lift adjustment control increases the rotational lift and reduces the gliding lift. The rotary wing control unit 621 controls the driving of the rotary wing 13 such that the rotational lift of the rotary wing 13 driven by the battery 151 in which the abnormality is predicted or detected is larger than that in a case where the normal control is performed. The fixed wing control unit 622 controls the driving of the lift adjustment mechanism 14 such that the gliding lift is smaller than that when the normal control is performed. When the process in step S209 is performed, the series of processes ends. Other configurations are the same as those described in the preceding embodiment.

<Summary of Fifth Embodiment>

According to the present embodiment, when the low temperature abnormality in which the temperature of the battery 151 is lower than a predetermined temperature (threshold) is predicted or detected, the control device 60 performs the first lift adjustment control (lift adjustment control) during the landing time of the eVTOL 10. Since the rotational lift of the rotary wing 13 driven by the battery 151 in which the low temperature abnormality is predicted or detected is reduced, the load on the battery 151 can be reduced. Since the gliding lift is increased, the safety of landing can be enhanced.

In order to reduce the rotational lift, the output of the battery 151 in which the abnormality is predicted or detected may be stopped. The load on the battery 151 can be greatly reduced. Since the operation of the battery 151 in which the abnormality occurs is stopped until the abnormality is eliminated, the safety of the flight can be enhanced.

When the low temperature abnormality is predicted or detected, the control device 60 performs the second lift adjustment control during the cruising time of the eVTOL 10. The control device 60 increases the rotational lift of the rotary wing 13 driven by the battery 151 in which the low temperature abnormality is predicted or detected. The control device 60 increases heat generated by the driving device 15 that drives the target rotary wing 13, that is, the driving device 15 including the battery 151 in which the low temperature abnormality is predicted or detected. Accordingly, a possibility of preventing or eliminating the low temperature abnormality can be increased. Further, by reducing the gliding lift, the total lift can be balanced.

<Modification>

The configuration described in the present embodiment may be combined with the configurations described in the first embodiment, the second embodiment, the third embodiment, and the fourth embodiment. For example, the lift adjustment control (first lift adjustment control) may be performed in any one of the cases of the low SOC abnormality during the cruising time, the high temperature abnormality during the cruising time, and the low temperature abnormality during the landing time. The second lift adjustment control may be performed in the case of the low temperature abnormality during the cruising time.

The configuration described in the present embodiment may be combined with the configuration including the monitoring device 70 shown in FIG. 9. For example, the information acquisition device 50 may acquire the temperature information of the battery 151 from the BMS 16, and the monitoring device 70 may perform the abnormality prediction or the abnormality detection based on the acquired information. The information acquisition device 50 may acquire the battery data from the BMS 16, and the monitoring device 70 may estimate the battery temperature and predict or detect the temperature abnormality based on the acquired battery data.

Sixth Embodiment

This embodiment is a modification of a basic aspect of the preceding embodiment, and the description of the preceding embodiment can be incorporated. In the preceding embodiment, the lift adjustment control is performed when the abnormality of at least one driving device 15 is predicted or detected. Instead, the lift adjustment control may be performed when the abnormality is predicted or detected in all the driving devices 15 provided redundantly.

Figure 15:
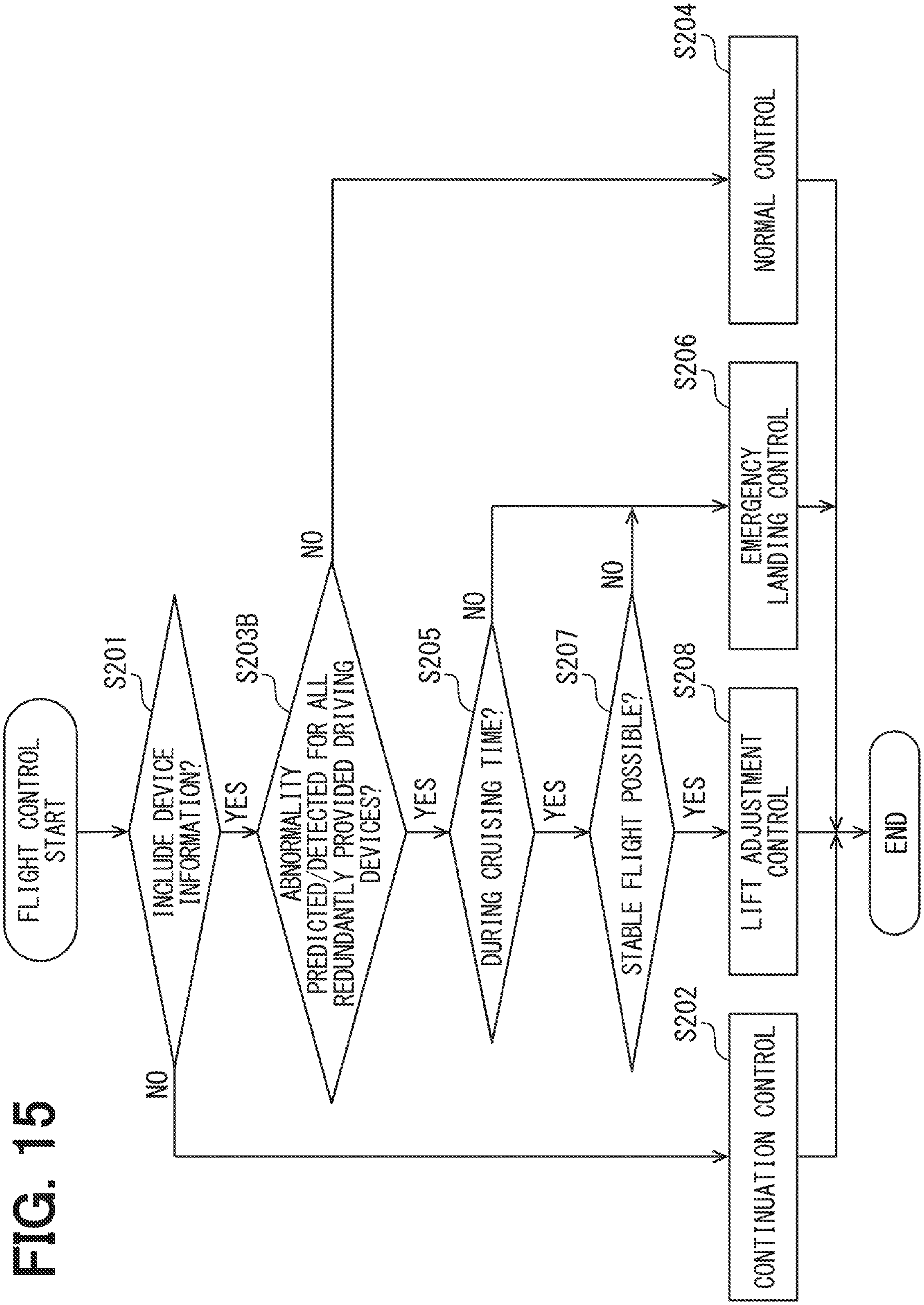
FIG. 15 is a flowchart showing a flight control method in a sixth embodiment.

FIG. 15 is a flowchart showing the flight control method according to the present embodiment. As shown in FIG. 15, the determination unit 61 of the control device 60 determines, based on the acquired device information, whether the abnormality prediction information or the abnormality detection information is acquired for all of the redundantly provided driving devices 15 (step S203B). As an example, in the present embodiment, the electric power can be supplied from two batteries 151 to one EPU 152 corresponding to one rotary wing 13. That is, two batteries 151 are redundantly provided for one rotary wing 13.

For example, when the low SOC abnormality is predicted or detected in only one of the two batteries 151 which drive the common rotary wing 13, the flight control unit 62 performs the process in step S204, that is, the normal control. When, for example, the low SOC abnormality is predicted or detected in each of the two batteries 151 which drive the common rotary wing 13, the determination unit 61 determines that the abnormality prediction information or the abnormality detection information is acquired for all of the driving devices 15 which are redundantly provided. In this case, for example, when the eVTOL 10 is during the cruising time and the stable flight is possible, the flight control unit 62 performs the process in step S208, that is, the lift adjustment control. Other configurations are the same as those described in the preceding embodiment.

<Summary of Sixth Embodiment>

There is a concern that the high temperature abnormality of the battery 151 or the EPU 152, the low SOC abnormality of the battery 151, and the like occur simultaneously in the multiple driving devices 15 which drive the common rotary wing 13. That is, there is a concern that the redundancy cannot be secured, and the safety of the flight cannot be secured.

In the present embodiment, when the abnormality is predicted or detected in each of the driving devices 15 which are provided redundantly, the control device 60 performs the lift adjustment control. Accordingly, even when both of the two batteries 151 which drive the common rotary wing 13 are abnormal, the possibility of preventing or eliminating the abnormality can be increased. As a result, the safety of the flight can be enhanced.

<Modification>

Although an example in which the batteries 151 are redundantly provided for the rotary wing 13 has been described, the present invention is not limited thereto. The EPUs 152 may be redundantly provided for the rotary wing 13. Both the batteries 151 and the EPUs 152 may be redundantly provided for the rotary wing 13.

The configuration described in the present embodiment may be combined with the configurations described in the first embodiment, the second embodiment, the third embodiment, the fourth embodiment, and the fifth embodiment. For example, the control device 60 may perform the second lift adjustment control when a low temperature abnormality is predicted or detected in each of the redundantly provided driving devices 15 during the cruising time.

Other Embodiments

The disclosure in the descriptions, the drawings, and the like is not limited to the illustrated embodiments. The disclosure encompasses the illustrated embodiments and modifications thereof made by those skilled in the art. For example, the disclosure is not limited to combinations of components and/or elements described in the embodiments. The disclosure may be implemented in various combinations. The disclosure may have an additional portion that can be added to the embodiments. The disclosure encompasses omission of the components and/or the elements of the embodiments. The disclosure encompasses the replacement or combination of the components and/or the elements between one embodiment and another. The disclosed technical scope is not limited to those described in the embodiments. The several technical scopes disclosed are indicated by the description of the claims, and should be construed to include all modifications within the meaning and range equivalent to the description of the claims.

The disclosure in the descriptions, the drawings, and the like is not limited by the description of the claims. The disclosure in the descriptions, the drawings, and the like encompasses the technical ideas described in the claims, and extends to technical ideas that are more diverse and extensive than the technical ideas described in the claims. Accordingly, various technical ideas can be extracted from the disclosure in the descriptions, the drawings, and the like without being restricted by the description of the claims.

When it is mentioned that a certain element or layer is "on", "coupled", "connected", or "bonded", the certain element or layer may be directly on, coupled, connected, or bonded to another element or layer, or an interposed element or an interposed layer may be present. In contrast, when it is mentioned that a certain element is "directly on", "directly coupled", "directly connected", or "directly bonded" to another element or layer, no interposed element or interposed layer is present. Other words used to describe a relationship between elements should be interpreted in the similar manner (for example, "between" and "directly between", "adjacent to" and "directly adjacent to"). When used in the description, the term "and/or" includes any of and all combinations related to one or multiple associated listed items.

Each of the various flowcharts shown in the present disclosure is an example, and the number of steps constituting the flowchart and the execution order of the process can be appropriately changed. The device, the system, and the method described in the present disclosure may be implemented by a dedicated computer constituting a processor that is programmed to execute one or multiple functions implemented by a computer program. The device and the method described in the present disclosure may be implemented using a dedicated hardware logic circuit. Further, the device and the method described in the present disclosure may be implemented by one or multiple dedicated computers implemented by a combination of a processor that executes a computer program and one or more hardware logic circuits.

For example, a part or all of the functions of the processor 201 may be implemented as hardware. An aspect in which a certain function is implemented as hardware includes an aspect in which one or multiple ICs are used. As the processor (arithmetic core), a CPU, an MPU, a GPU, a DFP, or the like can be adopted. The CPU is an abbreviation of a central processing unit. The MPU is an abbreviation of a micro-processing unit. The GPU is an abbreviation of a graphics processing unit. The DFP is an abbreviation of a data flow processor.

A part or all of the functions of the processor 201 may be implemented by combining multiple types of calculation processing devices. A part or all of the functions of the processor 201 may be implemented using an SoC, an ASIC, an FPGA, or the like. The SoC is an abbreviation of a system-on chip. The ASIC is an abbreviation of an application specific integrated circuit. The FPGA is an abbreviation of a field programmable gate array. The same applies to the processor 311.

The computer program may be stored in a computer-readable non-transitionary tangible recording medium (non-transitory tangible storage medium) as an instruction to be executed by the computer. As the program storage medium, an HDD, an SSD, a flash memory, or the like can be adopted. The HDD is an abbreviation of a hard disk drive. The SSD is an abbreviation of a solid state drive. A program for causing a computer to function as the information acquisition device 50 or the control device 60, and a non-transitory tangible recording medium such as a semiconductor memory in which the program is recorded are also included in the scope of the present disclosure.

(Disclosure of Technical Ideas)

This description discloses multiple technical ideas described in multiple items listed below. Some items may be written in a multiple dependent form with subsequent items referring to the preceding item as an alternative. Some items may be written in a multiple dependent form referring to another multiple dependent form. These items written in a multiple dependent form define multiple technical ideas.

(Technical Idea 1)

A control device is for an electric flight vehicle (10). The electric flight vehicle includes a rotary wing (13) configured to be driven by a driving device (15) to generate rotational lift, a fixed wing (12) configured to generate gliding lift, and a lift adjustment mechanism (14) configured to adjust the gliding lift. The control device includes: a rotary wing control unit (621) configured to adjust the rotational lift by controlling driving of the rotary wing; and a fixed wing control unit (622) configured to adjust the gliding lift by controlling driving of the lift adjustment mechanism. When an abnormality of the driving device is predicted or detected in a flight time of the electric flight vehicle, the rotary wing control unit and the fixed wing control unit are configured to perform lift adjustment control such that the rotary wing control unit reduces the rotational lift and the fixed wing control unit increases the gliding lift.

(Technical Idea 2)

The control device according to technical idea 1, in which when an abnormality of the driving device is predicted or detected, the rotary wing control unit and the fixed wing control unit are configured to perform the lift adjustment control in a cruising time of the electric flight vehicle.

(Technical Idea 3)

The control device according to technical idea 2, in which the rotary wing control unit and the fixed wing control unit are configured to perform the lift adjustment control in the cruising time of the electric flight vehicle and in at least a predetermined period before start of landing.

(Technical Idea 4)

The control device according to technical idea 2 or 3, in which when an abnormality of the driving device is predicted or detected, the rotary wing control unit and the fixed wing control unit are configured to perform the lift adjustment control in a flight time of the electric flight vehicle in a quietness required area.

(Technical Idea 5)

The control device according to any one of technical ideas 2 to 4, in which the rotary wing control unit and the fixed wing control unit are configured to perform the lift adjustment control while maintaining thrust and total lift, with which the electric flight vehicle is capable of stably flying within a predetermined altitude range and a predetermined flight speed range.

(Technical Idea 6)

The control device according to technical idea 5, in which the rotary wing control unit and the fixed wing control unit are configured to perform control for landing the electric flight vehicle, when the electric flight vehicle is not capable of maintaining the thrust and the total lift with which the electric flight vehicle is capable of stably flying.

(Technical Idea 7)

The control device according to any one of technical ideas 2 to 5, in which landing of the electric flight vehicle is restricted in execution of the lift adjustment control.

(Technical Idea 8)

The control device according to technical idea 1, in which when an abnormality of the driving device is predicted or detected, the rotary wing control unit and the fixed wing control unit are configured to perform the lift adjustment control in a landing time of the electric flight vehicle.

(Technical Idea 9)

The control device according to technical idea 1, in which execution of the lift adjustment control is prohibited in a take-off time of the electric flight vehicle.

(Technical Idea 10)

The control device according to any one of technical ideas 1 to 9, in which the driving device includes a plurality of devices redundantly provided for the rotary wing, and the rotary wing control unit and the fixed wing control unit are configured to perform the lift adjustment control when an abnormality of each of the plurality of redundantly provided devices is predicted or detected.

(Technical Idea 11)

The control device according to any one of technical ideas 1 to 10, in which the driving device includes a battery (151), and the abnormality of the driving device includes an abnormality of the battery.

(Technical Idea 12)

The control device according to technical idea 11, in which when a low SOC abnormality in which an SOC of the battery falls below a predetermined value is predicted or detected, the rotary wing control unit and the fixed wing control unit are configured to perform the lift adjustment control.

(Technical Idea 13)

The control device according to technical idea 11, in which when a temperature abnormality of the battery is predicted or detected, the rotary wing control unit and the fixed wing control unit are configured to perform the lift adjustment control.

(Technical Idea 14)

The control device according to technical idea 13, in which when a high temperature abnormality in which temperature of the battery is higher than predetermined temperature is predicted or detected, the rotary wing control unit and the fixed wing control unit are configured to perform the lift adjustment control.

(Technical Idea 15)

The control device according to technical idea 13, in which when a low temperature abnormality in which temperature of the battery is lower than predetermined temperature is predicted or detected, the rotary wing control unit and the fixed wing control unit are configured to perform first lift adjustment control that is the lift adjustment control in a landing time of the electric flight vehicle, and perform second lift adjustment control in a cruising time of the electric flight vehicle such that the rotary wing control unit increases the rotational lift and the fixed wing control unit reduces the gliding lift.

What is claimed is:

1. A control device for an electric flight vehicle, the electric flight vehicle including a rotary wing configured to be driven by a driving device to generate rotational lift, a fixed wing configured to generate gliding lift, and a lift adjustment mechanism configured to adjust the gliding lift, the control device comprising:

a rotary wing control unit configured to adjust the rotational lift by controlling driving of the rotary wing; and a fixed wing control unit configured to adjust the gliding lift by controlling driving of the lift adjustment mechanism, wherein when an abnormality of the driving device is predicted or detected in a flight time of the electric flight vehicle, the rotary wing control unit and the fixed wing control unit are configured to perform lift adjustment control such that the rotary wing control unit reduces the rotational lift and the fixed wing control unit increases the gliding lift.

2. The control device according to claim 1, wherein when an abnormality of the driving device is predicted or detected, the rotary wing control unit and the fixed wing control unit are configured to perform the lift adjustment control in a cruising time of the electric flight vehicle.

3. The control device according to claim 2, wherein the rotary wing control unit and the fixed wing control unit are configured to perform the lift adjustment control in the cruising time of the electric flight vehicle and in at least a predetermined period before start of landing.

4. The control device according to claim 2, wherein when an abnormality of the driving device is predicted or detected, the rotary wing control unit and the fixed wing control unit are configured to perform the lift adjustment control in a flight time of the electric flight vehicle in a quietness required area.

5. The control device according to claim 2, wherein the rotary wing control unit and the fixed wing control unit are configured to perform the lift adjustment control while maintaining thrust and total lift, with which the electric flight vehicle is capable of stably flying within a predetermined altitude range and a predetermined flight speed range.

6. The control device according to claim 5, wherein the rotary wing control unit and the fixed wing control unit are configured to perform control for landing the electric flight vehicle, when the electric flight vehicle is not capable of maintaining the thrust and the total lift with which the electric flight vehicle is capable of stably flying.

7. The control device according to claim 2, wherein landing of the electric flight vehicle is restricted in execution of the lift adjustment control.

8. The control device according to claim 1, wherein when an abnormality of the driving device is predicted or detected, the rotary wing control unit and the fixed wing control unit are configured to perform the lift adjustment control in a landing time of the electric flight vehicle.

9. The control device according to claim 1, wherein execution of the lift adjustment control is prohibited in a take-off time of the electric flight vehicle.

10. The control device according to claim 1, wherein the driving device includes a plurality of devices redundantly provided for the rotary wing, and the rotary wing control unit and the fixed wing control unit are configured to perform the lift adjustment control when an abnormality of each of the plurality of redundantly provided devices is predicted or detected.

11. The control device according to claim 1, wherein the driving device includes a battery, and the abnormality of the driving device includes an abnormality of the battery.

12. The control device according to claim 11, wherein when a low SOC abnormality in which an SOC of the battery falls below a predetermined value is predicted or detected, the rotary wing control unit and the fixed wing control unit are configured to perform the lift adjustment control.

13. The control device according to claim 11, wherein when a temperature abnormality of the battery is predicted or detected, the rotary wing control unit and the fixed wing control unit are configured to perform the lift adjustment control.

14. The control device according to claim 13, wherein when a high temperature abnormality in which temperature of the battery is higher than predetermined temperature is predicted or detected, the rotary wing control unit and the fixed wing control unit are configured to perform the lift adjustment control.

15. The control device according to claim 13, wherein when a low temperature abnormality in which temperature of the battery is lower than predetermined temperature is predicted or detected, the rotary wing control unit and the fixed wing control unit are configured to perform first lift adjustment control that is the lift adjustment control in a landing time of the electric flight vehicle, and perform second lift adjustment control in a cruising time of the electric flight vehicle such that the rotary wing control unit increases the rotational lift and the fixed wing control unit reduces the gliding lift.

16. An operation management system for an electric flight vehicle, the electric flight vehicle including a rotary wing configured to be driven by a driving device to generate rotational lift, a fixed wing configured to generate gliding lift, and a lift adjustment mechanism configured to adjust the gliding lift, the operation management system comprising:

an information acquisition device configured to acquire information related to flight of the electric flight vehicle; and a control device configured to perform flight control based on the information, wherein the control device includes a rotary wing control unit configured to adjust the rotational lift by controlling driving of the rotary wing, and a fixed wing control unit configured to adjust the gliding lift by controlling driving of the lift adjustment mechanism, and when information indicating that an abnormality of the driving device is predicted or detected is acquired as the information in a flight time of the electric flight vehicle, the rotary wing control unit and the fixed wing control unit are configured to perform lift adjustment control such that the rotary wing control unit reduces the rotational lift and the fixed wing control unit increase the gliding lift.

17. A non-transitory computer readable medium storing a computer program for controlling an electric flight vehicle, the electric flight vehicle including a rotary wing configured to be driven by a driving device to generate rotational lift, a fixed wing configured to generate gliding lift, and a lift adjustment mechanism configured to adjust the gliding lift, the computer program comprising instructions configured to, when executed by the at least one processor, cause the at least one processor to:

adjust the rotational lift by controlling driving of the rotary wing;

adjust the gliding lift by controlling driving of the lift adjustment mechanism; and when an abnormality of the driving device is predicted or detected in a flight time of the electric flight vehicle, perform control for reducing the rotational lift and increasing the gliding lift.

18. A control device for an electric flight vehicle, the electric flight vehicle including a rotary wing configured to be driven by a driving device to generate rotational lift, a fixed wing configured to generate gliding lift, and a lift adjustment mechanism configured to adjust the gliding lift, the control device comprising:

at least one of (i) a circuit and (ii) a processor having a memory storing computer program code, wherein the at least one of the circuit and the processor having the memory is configured to cause the control device to:

adjust the rotational lift by controlling driving of the rotary wing;

adjust the gliding lift by controlling driving of the lift adjustment mechanism; and when an abnormality of the driving device is predicted or detected in a flight time of the electric flight vehicle, perform lift adjustment control such that the rotary wing control unit reduces the rotational lift and the fixed wing control unit increases the gliding lift.

* * * * *